US009422895B2

(12) United States Patent
Reddy et al.

(10) Patent No.: US 9,422,895 B2
(45) Date of Patent: Aug. 23, 2016

(54) SYSTEM FOR EVAPORATIVE AND REFUELING EMISSION CONTROL FOR A VEHICLE

(75) Inventors: Sam Reddy, West Bloomfield, MI (US); Kevin Walsh, Penngrove, CA (US)

(73) Assignee: KARMA Automotive LLC, Costa Mesa, CA (US)

( * ) Notice: Subject to any disclaimer, the term of this patent is extended or adjusted under 35 U.S.C. 154(b) by 255 days.

(21) Appl. No.: 13/244,160

(22) Filed: Sep. 23, 2011

(65) Prior Publication Data
US 2012/0152210 A1 Jun. 21, 2012

Related U.S. Application Data

(60) Provisional application No. 61/386,113, filed on Sep. 24, 2010.

(51) Int. Cl.
*F02M 25/08* (2006.01)
*B60K 15/035* (2006.01)

(52) U.S. Cl.
CPC ........ *F02M 25/089* (2013.01); *B60K 15/03504* (2013.01); *F02M 25/0809* (2013.01); *Y10T 137/0402* (2015.04)

(58) Field of Classification Search
CPC .......... F02M 25/0809; F02M 25/0836; F02M 25/0872; F02M 25/089; F02M 2025/0845
USPC ....................... 123/516, 518–521; 73/114.39; 137/15.01
See application file for complete search history.

(56) References Cited

U.S. PATENT DOCUMENTS

| 5,172,672 A | 12/1992 | Harada | |
|---|---|---|---|
| 5,425,344 A * | 6/1995 | Otsuka | ............... F02M 25/0809 123/198 D |
| 5,427,075 A * | 6/1995 | Yamanaka et al. | ............. 123/520 |
| 5,441,031 A * | 8/1995 | Kiyomiya | .............. F02M 25/08 123/518 |

(Continued)

FOREIGN PATENT DOCUMENTS

| CN | 102032075 A | 4/2011 |
|---|---|---|
| JP | H04-311664 | 11/1992 |

(Continued)

OTHER PUBLICATIONS

International Search Report and Written Opinion issued for PCT/US2011/053055; Feb. 23, 2012; 7 pgs.

(Continued)

*Primary Examiner* — Mahmoud Gimie
*Assistant Examiner* — John Zaleskas
(74) *Attorney, Agent, or Firm* — Farjami & Farjami LLP

(57) ABSTRACT

A fuel tank evaporative emissions control and diagnostic system includes a fuel tank, a canister in fluid communication with the fuel tank to receive vapor escaping from the fuel tank, at least one isolation valve positioned between the fuel tank and the canister, a pressure sensor in fluid communication with the canister, a purge valve positioned between the canister and an internal combustion engine to be in fluid communication with the canister and the internal combustion engine, a canister vent valve positioned on an air inlet of the canister for allowing air to purge vapor from the canister to exit the and into the internal combustion engine, and one or more electronic controllers coupled to the pressure sensor, the isolation valve, the purge valve, and the canister vent valve for controlling the valves according to a preset diagnostic test for checking for malfunctions in the system.

16 Claims, 21 Drawing Sheets

(56) References Cited

U.S. PATENT DOCUMENTS

| | | | | |
|---|---|---|---|---|
| 5,450,834 A | * | 9/1995 | Yamanaka et al. | 123/520 |
| 5,477,842 A | * | 12/1995 | Maruyama et al. | 123/690 |
| 5,479,904 A | * | 1/1996 | Fujimori et al. | 123/520 |
| 5,495,842 A | * | 3/1996 | Yamanaka et al. | 123/520 |
| 5,592,923 A | * | 1/1997 | Machida | F02M 25/0809 |
| | | | | 123/520 |
| 5,601,065 A | * | 2/1997 | Tamura et al. | 123/516 |
| 5,611,319 A | * | 3/1997 | Machida | F02D 41/0042 |
| | | | | 123/680 |
| 5,647,332 A | * | 7/1997 | Hyodo et al. | 123/519 |
| 5,669,360 A | * | 9/1997 | Hyodo et al. | 123/520 |
| 5,739,421 A | * | 4/1998 | Iochi et al. | 73/49.7 |
| 5,767,395 A | * | 6/1998 | Goto et al. | 73/114.39 |
| 5,775,307 A | * | 7/1998 | Isobe et al. | 123/520 |
| 5,826,566 A | * | 10/1998 | Isobe et al. | 123/520 |
| 5,845,625 A | * | 12/1998 | Kidokoro | F02M 25/0836 |
| | | | | 123/520 |
| 5,850,819 A | * | 12/1998 | Kunimitsu et al. | 123/520 |
| 5,857,447 A | * | 1/1999 | Shinohara | F02M 25/0809 |
| | | | | 123/520 |
| 5,884,610 A | * | 3/1999 | Reddy | 123/520 |
| 5,911,209 A | * | 6/1999 | Kouda et al. | 123/520 |
| 6,089,080 A | * | 7/2000 | Takaku | F02M 25/0809 |
| | | | | 123/520 |
| 6,105,556 A | * | 8/2000 | Takaku | F02M 25/0809 |
| | | | | 123/198 D |
| 6,227,037 B1 | * | 5/2001 | Kawamura et al. | 73/49.7 |
| 6,289,947 B1 | * | 9/2001 | Heimbrodt | B60K 15/035 |
| | | | | 141/128 |
| 6,308,119 B1 | * | 10/2001 | Majkowski et al. | 701/33.6 |
| 6,330,879 B1 | * | 12/2001 | Kitamura et al. | 123/520 |
| 6,336,446 B1 | * | 1/2002 | Isobe et al. | 123/520 |
| 6,347,617 B1 | * | 2/2002 | Kitamura et al. | 123/520 |
| 6,367,457 B1 | * | 4/2002 | Mancini | F02M 25/08 |
| | | | | 123/516 |
| 6,467,463 B2 | * | 10/2002 | Kitamura et al. | 123/516 |
| 6,658,925 B2 | | 12/2003 | Cook et al. | |
| 6,789,523 B2 | * | 9/2004 | Oki et al. | 123/198 D |
| 6,950,742 B2 | * | 9/2005 | Yamaguchi et al. | 701/114 |
| 7,159,580 B2 | * | 1/2007 | Shikama et al. | 123/520 |
| 7,350,512 B1 | * | 4/2008 | Meacham et al. | 123/520 |
| 8,353,273 B2 | * | 1/2013 | Mc Lain et al. | 123/518 |
| 2001/0025525 A1 | * | 10/2001 | Isobe et al. | 73/118.1 |
| 2002/0046609 A1 | * | 4/2002 | Ito | F02M 25/0809 |
| | | | | 73/700 |
| 2002/0112702 A1 | * | 8/2002 | Weldon et al. | 123/520 |
| 2002/0157655 A1 | * | 10/2002 | Streib | F02M 25/0809 |
| | | | | 123/520 |
| 2003/0075156 A1 | * | 4/2003 | Morinaga et al. | 123/520 |
| 2004/0173011 A1 | * | 9/2004 | Nakoji | 73/118.1 |
| 2004/0200460 A1 | * | 10/2004 | Mitani et al. | 123/520 |
| 2004/0244781 A1 | * | 12/2004 | Toyoda | 123/520 |
| 2005/0022588 A1 | * | 2/2005 | Hayakawa | F02M 25/0809 |
| | | | | 73/114.41 |
| 2006/0065253 A1 | | 3/2006 | Reddy | |
| 2006/0081224 A1 | | 4/2006 | Spink et al. | |
| 2006/0191330 A1 | * | 8/2006 | Hayakawa | F02M 25/0809 |
| | | | | 73/114.39 |
| 2009/0007890 A1 | * | 1/2009 | Devries et al. | 123/520 |
| 2009/0308359 A1 | * | 12/2009 | Wang et al. | 123/520 |
| 2010/0288241 A1 | * | 11/2010 | Makino et al. | 123/521 |
| 2010/0288242 A1 | * | 11/2010 | Makino et al. | 123/521 |
| 2011/0079201 A1 | * | 4/2011 | Peters et al. | 123/520 |
| 2013/0037007 A1 | * | 2/2013 | Reddy | B60K 15/03504 |
| | | | | 123/521 |

FOREIGN PATENT DOCUMENTS

| | | | | |
|---|---|---|---|---|
| JP | H06-081728 | | 3/1994 | |
| JP | 2000110672 A | * | 4/2000 | F02M 25/08 |
| JP | 2004-324529 | | 11/2004 | |
| JP | 2008-517201 | | 5/2008 | |

OTHER PUBLICATIONS

Office Action dated Jul. 29, 2014, from related Chinese Patent Application No. 201180055716.6, 15 total pages.

* cited by examiner

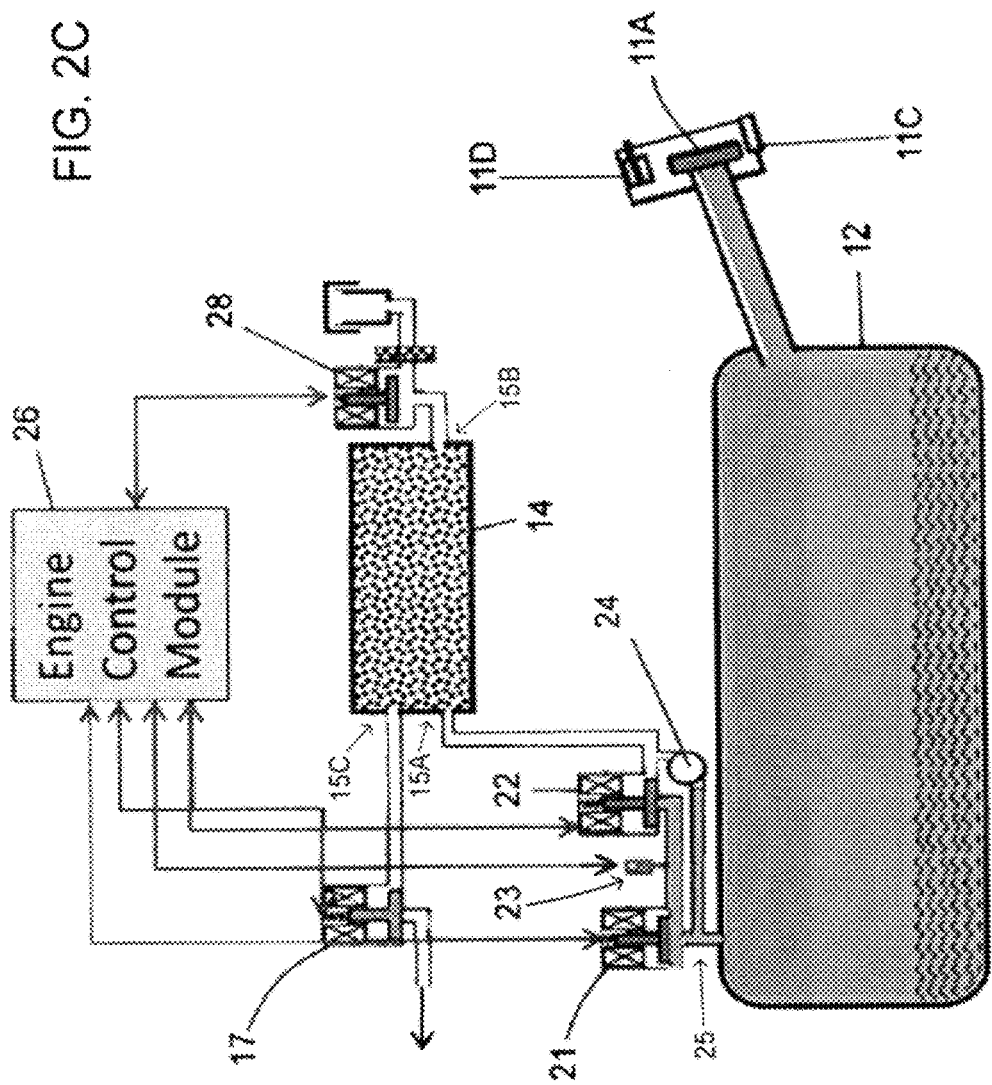

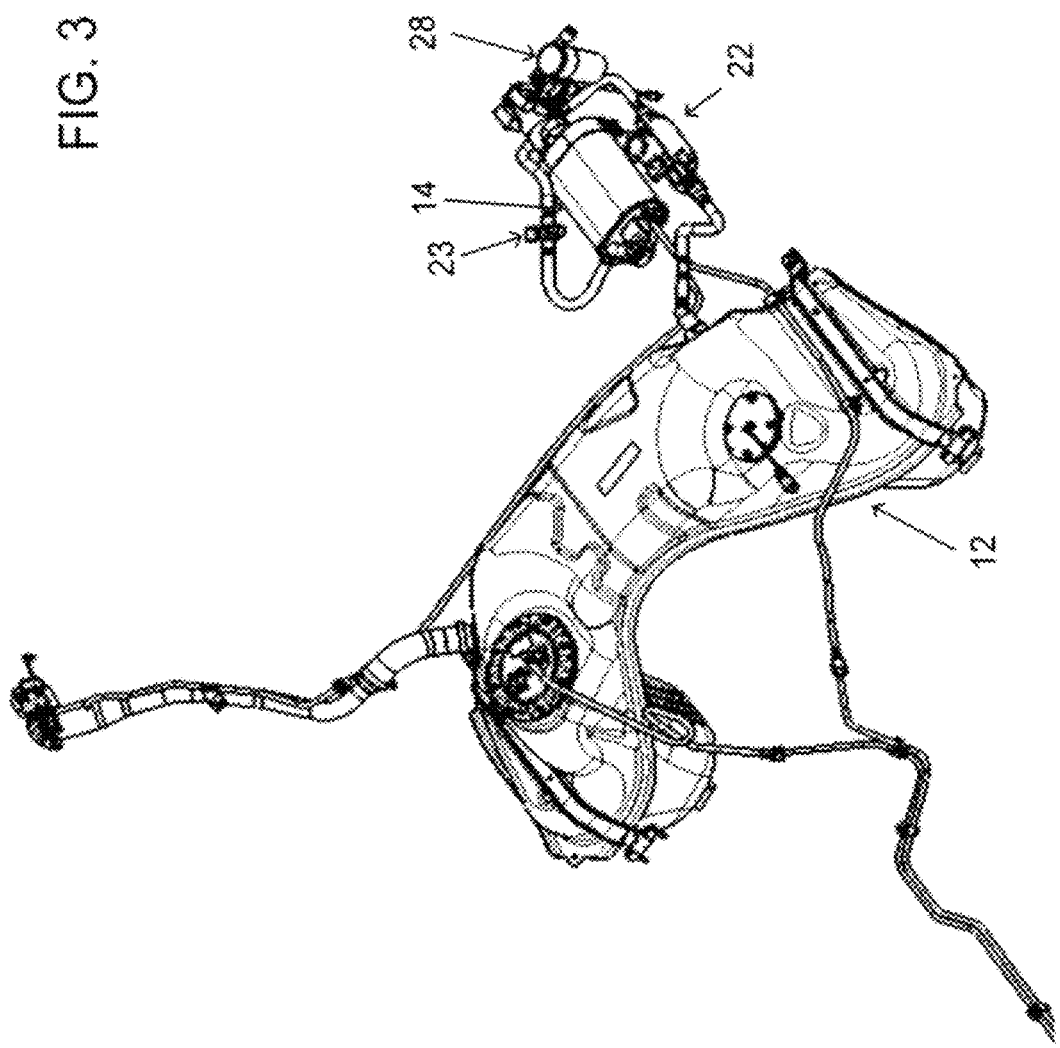

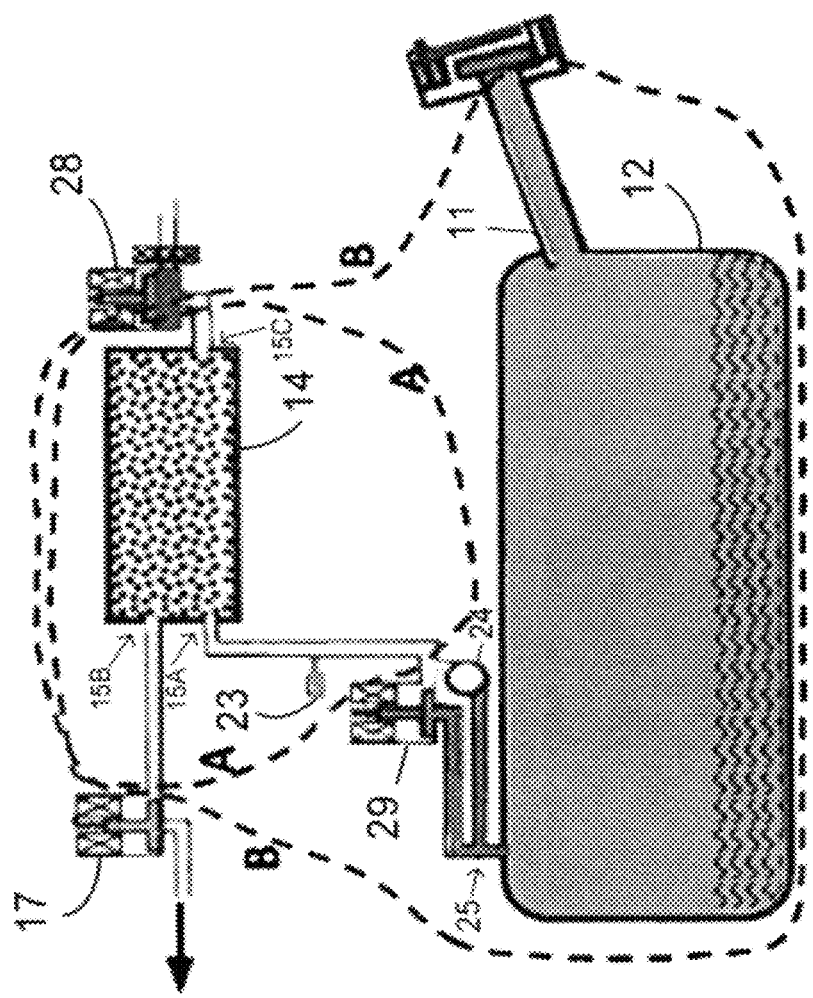

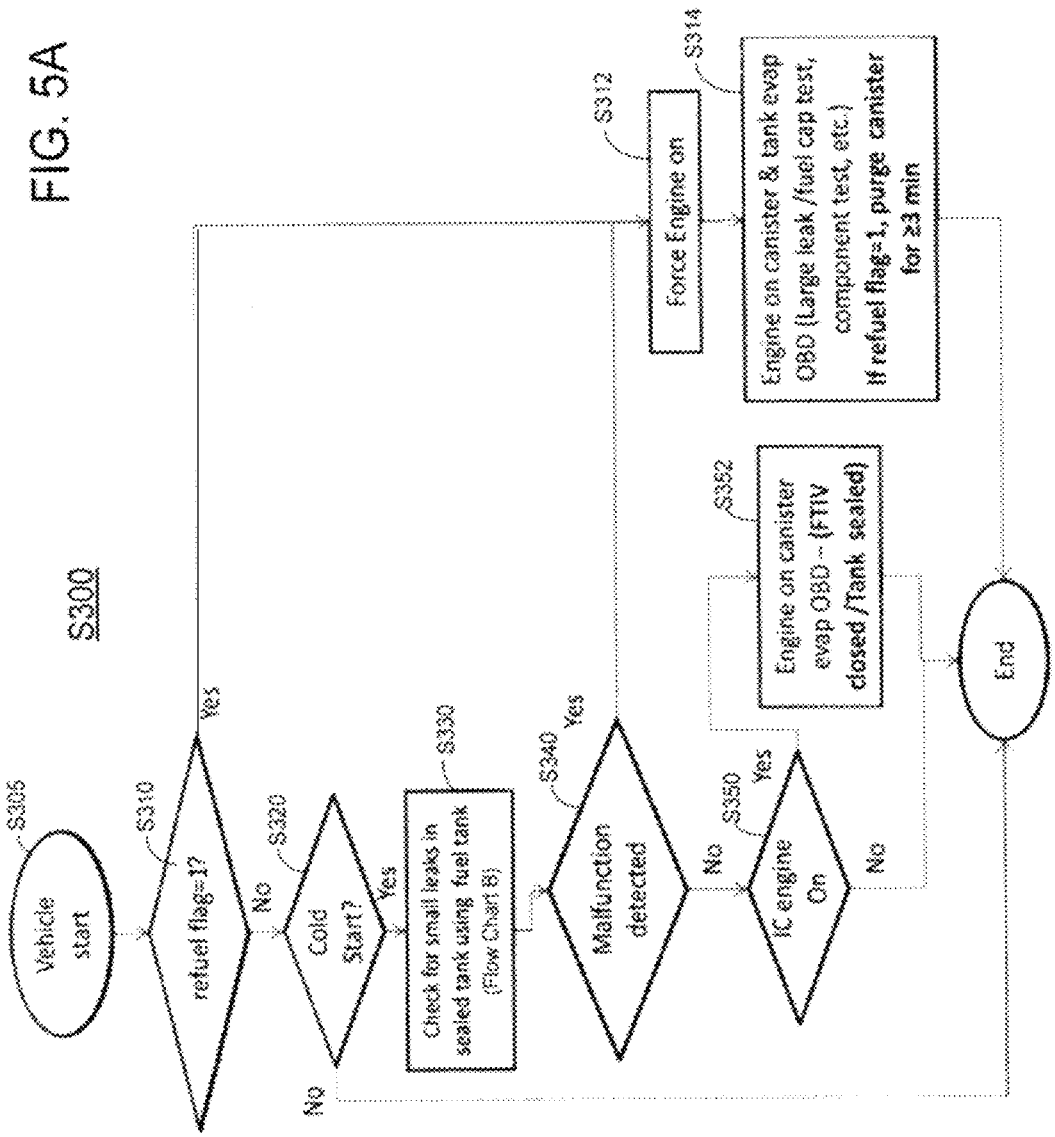

(Flow Chart A)

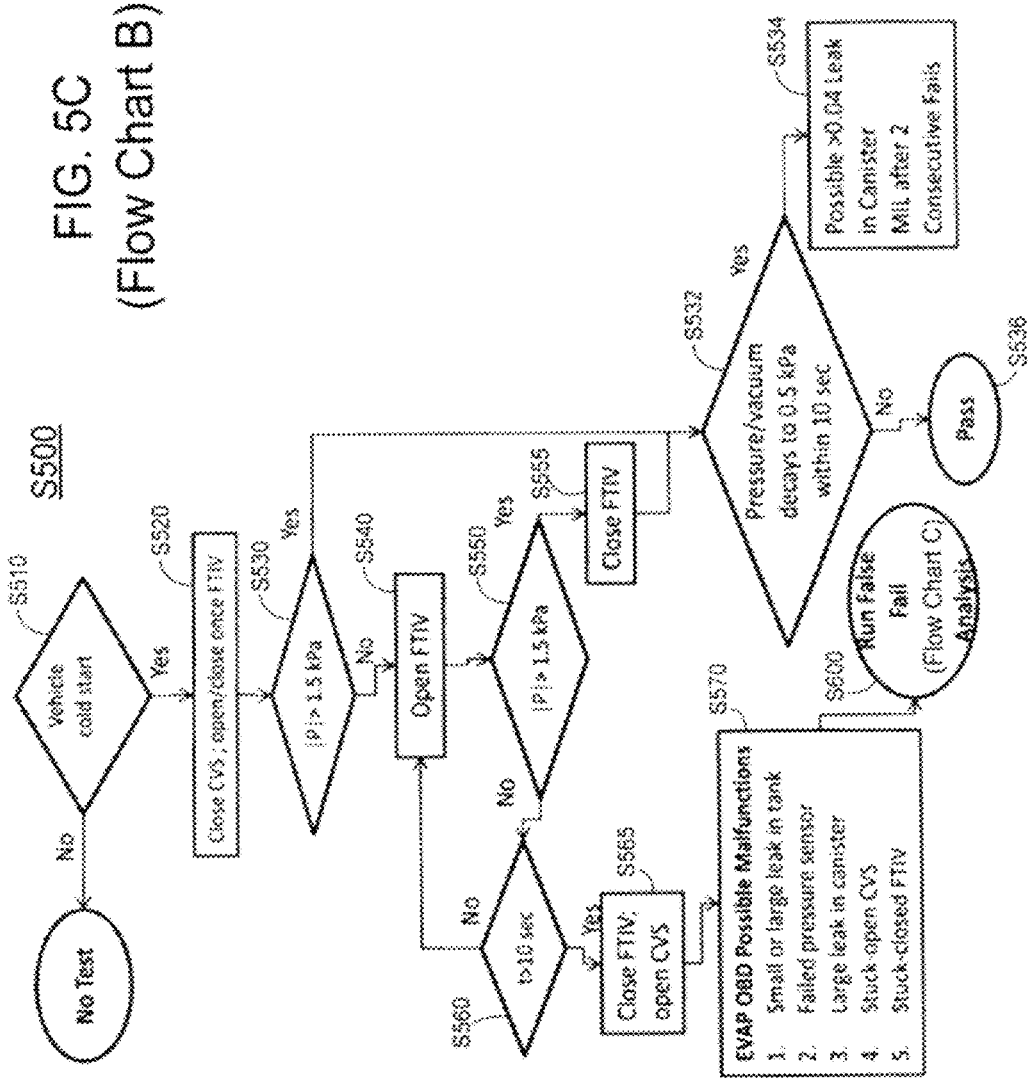

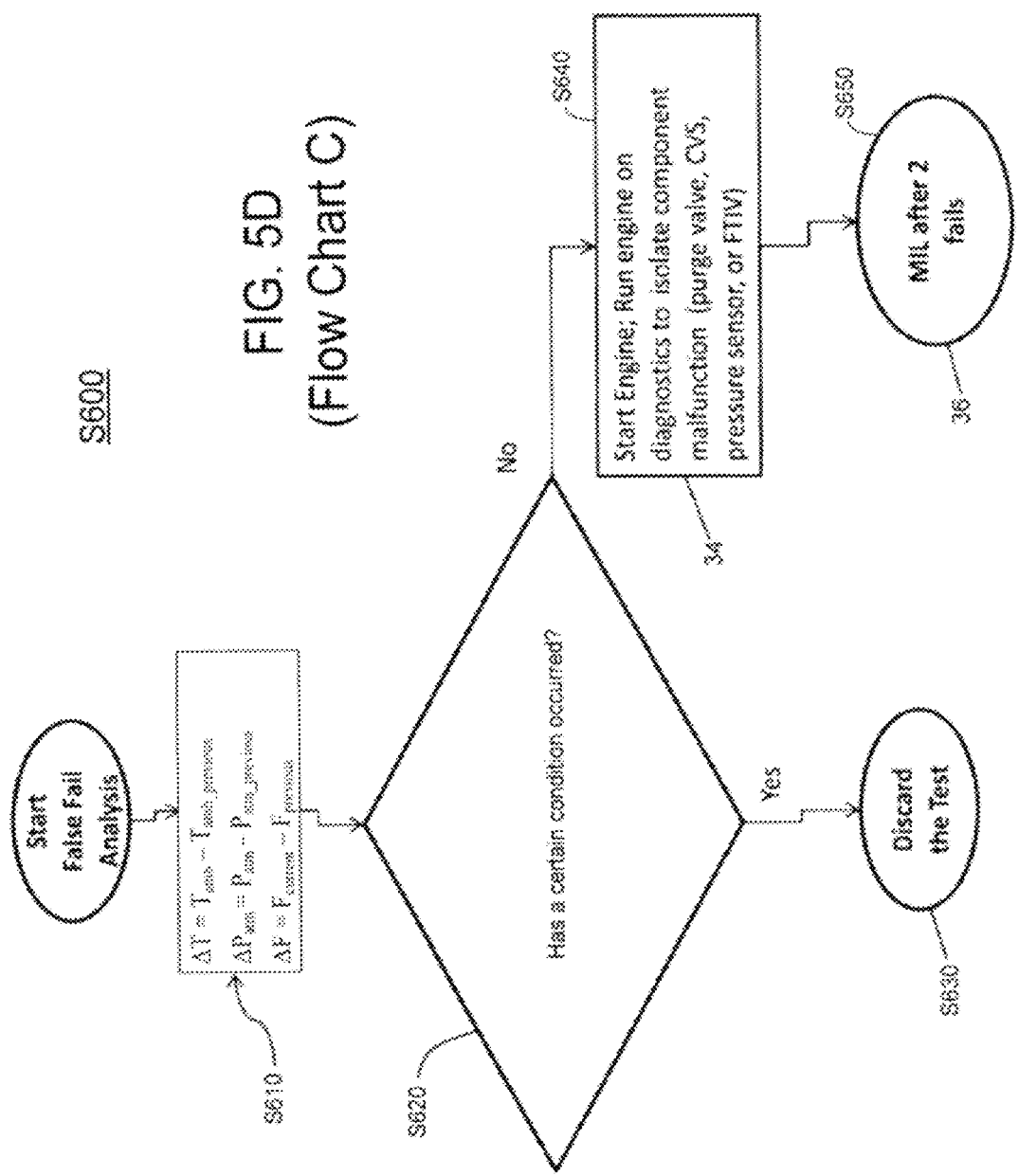

SYSTEM FOR EVAPORATIVE AND REFUELING EMISSION CONTROL FOR A VEHICLE

CROSS-REFERENCE TO RELATED PATENT APPLICATIONS

This application claims priority to and the benefit of U.S. Provisional Application No. 61/386,113, filed Sep. 24, 2010, which is incorporated by reference herein in its entirety.

BACKGROUND

The present disclosure relates generally to hybrid or gasoline vehicles, and particularly to systems and methods for managing emissions.

There is interest in producing passenger vehicles with minimal evaporative emissions (e.g., hydrocarbon emissions from a hydrocarbon-based fuel). Evaporative emissions (evap) from vehicles are subject to regulatory requirements that set limits and require on-board diagnostics to verify that a vehicle's emissions control system functions as designed and tested during vehicle certification.

Evaporative emissions control can be an issue for any vehicle that includes on-board fuel storage. For example, even though not primarily powered by conventional fuel, hybrid electric vehicles may require evaporative emissions control. An example of a hybrid electric vehicle is one that is powered by an electric motor having a rechargeable battery (e.g., a lithium-ion battery) and an alternative power source, such as an internal combustion (IC) engine (e.g., using gasoline or diesel fuel). The operating range and power of a battery-powered electric vehicle can be increased using an on-board electric generator driven upon demand by the IC engine. For relatively short driving excursions (e.g., under 50 miles), the capacity of the battery is sufficient and the IC engine is not required to be run. At the completion of such short excursions, the battery is recharged, for instance, by "plugging in" the vehicle to a shore based power source, such as conventional AC electric power provided by a public utility. Such a vehicle is sometimes called a plug-in hybrid vehicle (PHEV) or extended range electric vehicle (EREV).

The IC engine typically needs to operate in order for a typical hybrid vehicle to operate for longer distances (e.g., a few hundred miles). As a result, despite the IC engine's intermittent usage, the IC engine will, of course, require on-board fuel storage. The engine's fuel (e.g., gasoline) is stored in a vehicle fuel tank and is exposed to ambient heating, which increases the vapor pressure of the volatile hydrocarbon fuel. In conventional IC engines, fuel tank vapors (emissions), which typically comprises lower molecular weight hydrocarbons, are vented to an evaporative emissions control canister (or "evap canister") containing high surface area carbon granules for temporary adsorption of the fuel tank emissions. Later, during operation of the IC engine, ambient air is drawn through the carbon granule bed to purge adsorbed fuel from the surfaces of the carbon granules and carry the removed fuel into the air induction system of the IC engine. However, because hybrid vehicles may be used primarily for short range or local trips, the IC engine may not run for several days. As a result, no purging (cleaning) of the evaporative emission control canister occurs. If the evaporative emissions control canister is not purged, diurnal vapors can escape through the canister into the atmosphere as breakthrough diurnal emissions. An example of a fuel tank and canister system for purging such vapors is described in U.S. Pat. No. 7,448,367, which is herein incorporated by reference in its entirety, and is shown in FIG. 1.

In this exemplary system 0, a fuel inlet 1 is provided for delivering fuel to the fuel tank 2. A fuel tank pressure sensor 6 is mounted in the fuel tank 2 to monitor pressure within the fuel tank 2. The sensor 6 is coupled to a vehicle controller that monitors the pressure of the fuel tank 2. Vapor escapes from the fuel tank 2 through a vapor outlet 3 and into a first inlet 5A of the evap canister 4. A valve 8 is positioned at a second inlet 5B of the evap canister 4 that allows introduction of air into the evap canister 4 to purge the vapor out through an outlet 5C and drive the vapor to the combustion chamber of the IC engine. A purge valve 7 (normally closed) can open and close to let the purged vapor exit the evap canister 4. A pump 9 can be provided that drives the air into the evap canister 4 to check for leaks (e.g., when the IC engine is off).

Problems with a system such as shown in FIG. 1 include the following: too many sealed components (e.g., canister, purge valve, etc.) resulting in durability issues and potentially higher cost than necessary because only the fuel tank 2 actually needs to be sealed to prevent diurnal vapor generation; the evap canister 4 should be sealed only as necessary to prevent thermal bleed emissions between loading and purging the evap canister 4; too many possible leak paths and possible leak detection failures; purging the evap canister 4 also purges the fuel tank 2, which results in undesirable canister 4 loading and fuel weathering); performing a rationality check of the pressure sensor 6 is difficult because tank pressure has to be released which results in undesirable canister 4 loading and fuel weathering.

A sealed fuel tank 2 may generate little diurnal vapors. However, the fuel tank 2 will experience several psi pressure/vacuum changes due to diurnal temperature changes. The evap canister 4 is used only for capturing refueling vapors, which will be purged and consumed only when the tank fuel is consumed by the IC engine. Although the fuel tank 2 is sealed to prevent diurnal vapor generation, the evap canister 4 is also sealed to prevent thermal bleed emissions. In a particular scenario, the evap canister 4 is loaded (to or near capacity) with refueling vapor and then experiences several days/weeks of diurnal temperature cycles. When a loaded evap canister 4 is subjected to diurnal temperature increase, some air and hydrocarbons will be expelled from the evap canister 4 due to thermal expansion and hydrocarbon desorption from the carbon granules in the evap canister 4. To limit the thermal bleed emissions, the evap canister 4 is also sealed along with the fuel tank 2, as shown in FIG. 1. However, sealing both components produces some problems including, for example, the possibility of leaks in the evap canister 4 and valves (e.g., due to pressure/vacuum cycling fatigue), difficulty of purging the evap canister 4 without venting the fuel tank 2.

SUMMARY

According to various embodiments, a fuel tank evaporative emissions control and onboard evaporative diagnostic system includes, but is not limited to, any one or combination of, a fuel tank, a canister, at least one isolation valve, a pressure sensor, a purge valve, a canister vent valve, and one or more electronic controllers. The canister is in fluid communication with the fuel tank to receive vapor escaping from the fuel tank. The at least one isolation valve is positioned between the fuel tank and the canister. The pressure sensor is in fluid communication with the canister. The purge valve is positioned between the canister and an internal combustion engine to be in fluid communication with the canister and the internal combustion engine. The canister vent valve is positioned on an air inlet of the canister for allowing air to purge vapor from the canister to exit the canister and into the internal combustion engine. The one or more electronic controllers are coupled to the pressure sensor, the isolation valve, the purge valve, and the canister vent valve for controlling the valves according to preset diagnostic tests for checking for malfunctions in the system.

According to various embodiments, a method of manufacturing a fuel tank evaporative emissions control and onboard evaporative diagnostic system includes, but is not limited to, any one or combination of: (a) providing a fuel tank; (b) arranging a canister in fluid communication with the fuel tank to receive vapor escaping from the fuel tank; (c) positioning at least one isolation valve between the fuel tank and the canister; (d) arranging a pressure sensor in fluid communication with the canister; (e) positioning a purge valve between the canister and an internal combustion engine to be in fluid communication with the canister and the internal combustion engine; (f) positioning a canister vent valve on an air inlet of the canister for allowing air to purge vapor from the canister to exit the canister and into the internal combustion engine; and (g) coupling one or more electronic controllers to the pressure sensor, the isolation valve, the purge valve, and the canister vent valve for controlling the valves according to preset diagnostic tests for checking for malfunctions in the system.

In various embodiments, fuel tank and canister leak diagnostic tests can be performed with fewer hardware components than other diagnostic systems. In various embodiments, fuel tank and canister diagnostic tests can be performed without sealing the evap canister. In various embodiments, fuel vapor emissions and control can be utilized more effectively. In various embodiments, cost and part complexity can be reduced, while increasing reliability and decreasing warranty claims.

BRIEF DESCRIPTION OF THE DRAWINGS

FIGS. 2A-2C illustrate an evaporative emission control system according to various embodiments of the disclosure.

FIG. 3 illustrates a perspective view of a fuel tank and a vapor recovery canister according to various embodiments of the disclosure.

FIGS. 4A-4C illustrate an evaporative emission control system according to various embodiments of the disclosure.

FIGS. 5A and 5C-5E illustrate various methods for diagnosing leaks and other malfunctions according to various embodiments of the disclosure.

DETAILED DESCRIPTION

The disclosure relates to various embodiments for controlling emissions of a vehicle, such as a plug-in hybrid electric vehicle ("PHEV") or extended range electric vehicle ("EREV") that operates mostly on batteries, and is supplemented by an IC engine that operates on a hydrocarbon-based fuel. In various embodiments, the vehicle may include other conventional features such as, for example, a motor, other controllers, a drive train.

Figure 2A:
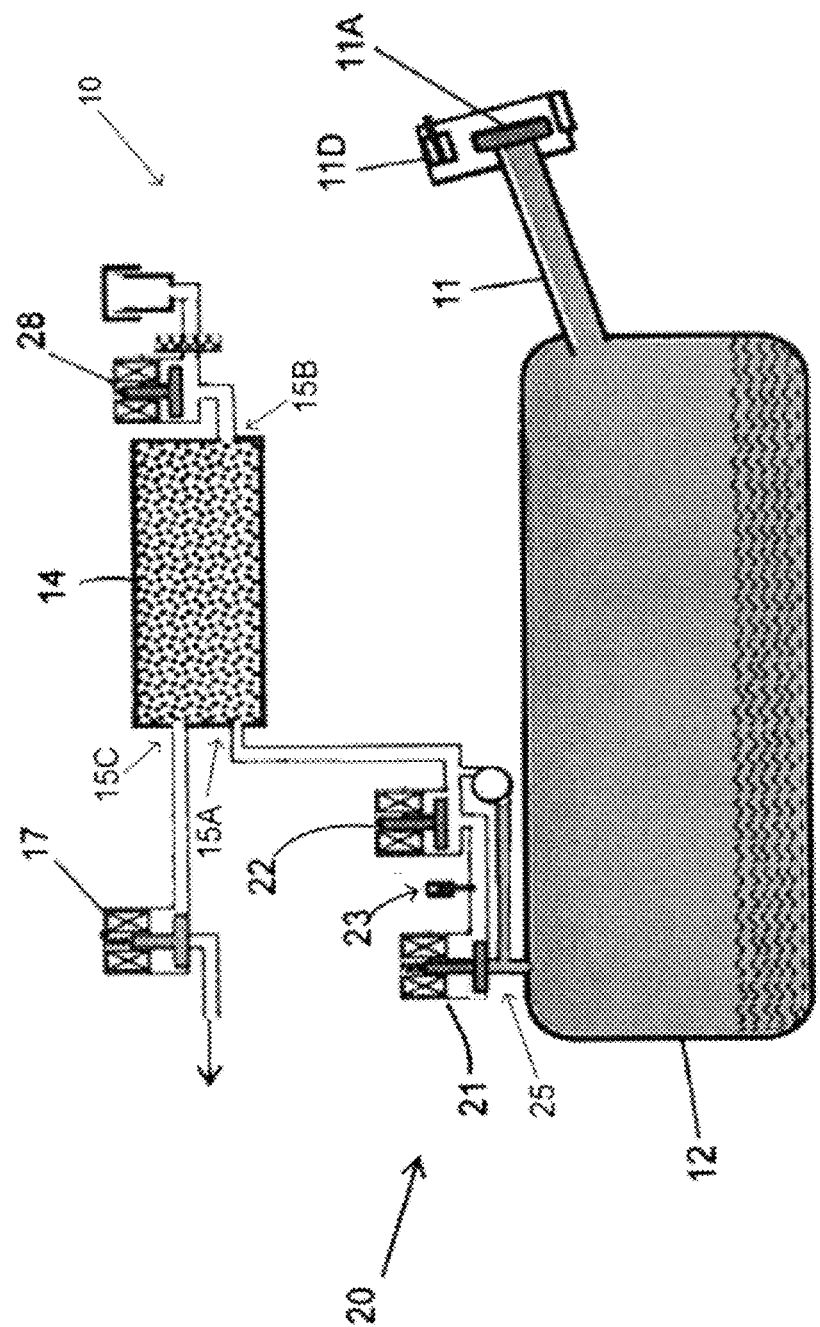
Figure 2B:
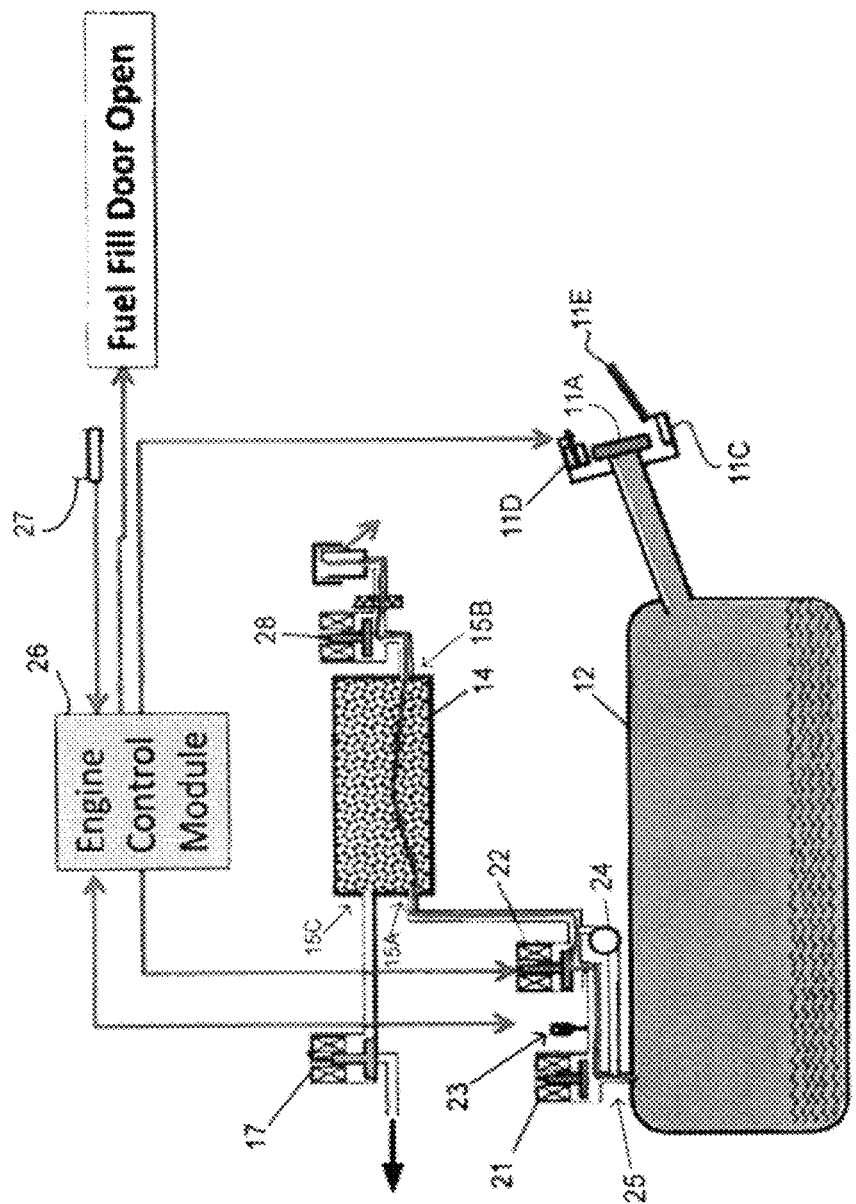

FIGS. 2A-2C illustrate an evaporative emissions control system 10 for controlling emissions of a vehicle. With reference to FIGS. 2A-2C, the vehicle is equipped with an IC engine (not shown) and a fuel tank 12 (e.g., a 10-gallon fuel tank). The IC engine provides power that may be used for electric power generation as a back-up to a battery or stored energy system in order to extend the driving range of the vehicle. An evaporative and refueling emission control canister 14 is a container filled with activated carbon, and is coupled to the fuel tank 12. The evap canister 14 and the activated carbon are provided to capture vapor escaping from the fuel tank 12 when the IC engine is not running. The vapor generation may occur daily and even nightly depending on fluctuation of environmental temperature and pressure. The vapor in the evap canister 14 may be purged through an outlet 15C to a combustion chamber of the IC engine when the IC engine is run. A purge valve 17 (normally closed) may open and close to let the purged vapor exit the evap canister 14. When the system is employed with PHEVs and EREVs, the canister 14 may not be purged regularly because the vehicle may operate for an extended time without ever running the IC engine.

In various embodiments, an oversized evap canister 14 may be provided to significantly reduce thermal bleed emissions. Typically, a 10-gallon PHEV fuel tank 12 requires a 1 L evap canister 14. Thus, a 1.5 L (or other sized) evap canister 14 may be provided to control thermal bleed emissions by reducing the chance of saturating the activated carbon in the evap canister 14. Accordingly, in some embodiments, sealing the evap canister 14 may not be required to limit thermal bleed emissions.

The fuel tank 12 includes a fuel inlet 11 for receiving fuel. Typically, the inlet 11 is covered by a fuel cap 11A. The fuel tank 12 is coupled to a pressure valve system 20. The valve system 20 includes a first diurnal control valve (DCV) 21, a second DCV 22, a pressure sensor (PS) 23, and a pressure/vacuum release valve 24 (e.g., a 3.5 psi pressure/−1.5 psi vacuum relief valve). In some embodiments, the first DCV 21 may be a normally open on/off valve. The first DCV 21 may be used to selectively seal the fuel tank 12. The second DCV 22 may be a normally closed on/off valve. The second DCV 22 may be used to perform a rationality check of the PS 23 and/or to allow the PS 23 to provide an indication of leaks in the evap canister 14 and other valves (e.g., by sealing the fuel tank 12 with the first DCV 21). In other embodiments, multiple pressure sensors may be disposed throughout the system 10, in order to provide a failsafe or check method if one or more of the pressure sensors are not functioning.

It is noted that each of the diurnal control valve ("DCV"), fuel tank isolation valve ("FTIV"), and fuel vapor containment valve ("FCV") may be an on/off control valve (e.g., solenoid controlled) that includes a pressure/vacuum relief mechanism. In the disclosed system, these valves are used for sealing the fuel tank 12 and the evap canister 14, or just the fuel tank 12. In some embodiments, the valves may be heavy spring loaded solenoid valves used for high pressure application. In some embodiments, the valves may be further be electronically controlled. In other embodiments, any suitable valves may be used.

In particular embodiments, the components of the valve system 20 are located along a vapor line 25 that splits along two paths and reconnects prior to the evap canister 14 through inlet 15A. The first path passes through the first DCV 21, the PS 23, and the second DCV 22. The second path passes through the release valve 24. A canister vent valve ("CVV") 28 (e.g., a solenoid controlled valve) is positioned on a fluid line entering the evap canister 14 through inlet 15B, or may be directly mounted to the evap canister 14 (e.g., FIG. 3). An engine control module 26 may be coupled to the PS 23 to receive pressure readings from the PS 23. In addition, the engine control module 26 (e.g., an electronic control unit (ECU)) is coupled to the valve system 20, the CVV 28, and/or the purge valve 17 for selectively opening and closing one or more valves in accordance with (but not limited to the) the methods disclosed in the disclosure. For instance, the engine control module 26 may be configured to send a signal to one or more of these components for selectively controlling the one or more components. The engine control module 26 can be coupled to or be synonymous with a vehicle controller (or other controller) as part of the vehicle computer system or the like.

The valve system 20, the CVV 28, and/or the purge valve 17 allows system diagnostics to be performed. Such as, for example, checking for leaks and other problems in the system 10, as will be detailed in the disclosure. The engine control module 26 (and/or other circuitry) operates these valves to isolate different portions of the system 10. Accordingly, the engine control module 26 may use the pressure readings from the PS 23 for each of these portions to determine if there is a problem (e.g., leak or malfunction) in a given portion and/or identify the portion having the problem.

In general, the fuel tank 12 will be under either a pressure or a vacuum. No pressure/vacuum may be an indication of a leak in the system 10, with some exceptions. These exceptions include, for example, when the pressure of the fuel tank 12 is essentially zero due to one or more of fuel consumption, ambient temperature change, ambient pressure change, etc. As discussed in the disclosure, the system 10 may check for any one or more of these factors before determining whether a leak exists. Thus, in various embodiments, a method for detecting leaks in the fuel tank 12 as well as the evap canister 14 may be based on the natural pressure/vacuum of the fuel tank 12. On exemplary method allows for the detection of very small leaks, including leaks that are less than 0.020" in diameter, which may cause evaporative emissions. Other methods do not require an external pump (which only detects leaks that are over 0.020" in diameter) and introduces unnecessary and/or undesired air into the fuel tank 12. In particular embodiments, such a method is performed upon a cold start (i.e., the vehicle is started after at least a certain amount of time since the last time the vehicle was operated). For instance, a cold start may occur by starting the vehicle after five or six hours since last using the vehicle (i.e., the soak time) or approximately enough time to allow coolant temperature to decline below a certain threshold value.

For example, during fuel fill up, both the first DCV 21 and the second DCV 22 are open (e.g., FIG. 2B) to allow vapor to escape the fuel tank 12 and be captured in the evap canister 14. Accordingly, rationality testing of the PS 23 may be performed. The first DCV 21 is open to expose vapor to the PS 23. The second DCV 22 is closed to seal the fuel tank 12 with the PS 23 and allow the PS 23 to measure the pressure of the fuel tank 12. When the first DCV 21 is open and the second DCV 22 is closed (e.g., FIG. 2C), the PS 23 should read existence of pressure at greater than zero atmospheres. Closing the first DCV 21 and opening the second DCV 22 (e.g., FIG. 2A) exposes the PS 23 to the atmosphere and thus the PS 23 should read approximately zero, if the PS 23 is operating correctly. If the PS 23 reads existence of pressure in this case, then the system 10 may identify, for example, that there may be a problem with the PS 23 (e.g., the PS 23 is stuck). In a further example, if the second DCV 22 is closed and the first DCV 21 (e.g., FIG. 2C) is open and a pressure degradation is read on the PS 23, then a problem may exist with the fuel tank 12 (e.g., a leak), the fuel cap 11A, and/or the like. In an even further example, to test or diagnose a problem with the evap canister 14, the first DCV 21 can be closed, the second DCV 22 opened, and the purge valve 17 closed during a purge. If pressure degradation is read by the PS 23, then an evap canister 14 leak may exist.

In various embodiments, a method for checking operation of the purge valve 17 and for leaks in the evap canister 14, which may be performed when the IC engine is running, may include (but is not limited to) powering on and closing the first DCV 21. The second DCV 22 is also powered on and opened. Pressure sensor rationality is then performed on the PS 23 by reading ambient pressure. Then, the CVV 28 is powered and closed. After which the purge valve 17 is modulated and a manifold vacuum (not shown) is applied to the evap canister 14 (e.g., through the outlet 15C) until the PS 23 reads a predetermined pressure value (e.g., 10" H20 vacuum) for the evap canister 14. Vacuum decay in the evap canister 14 is then monitored by the engine control module 26 (e.g., via the PS 23). If there is no decay, then the purge valve 17 is operating correctly and there is no leak in the evap canister 14. Accordingly, the engine control module 26 can close the second DCV 22 and open the first DCV 21 and the CVV 28, and then continue purging the evap canister 14 by modulating the purge valve 17. If there is decay, then a determination may be made that the evap canister 14 has a leak and/or the purge valve 17 is faulty. Accordingly, the vehicle computer system can diagnose this occurrence and provide a notification to a user or technician through various ways including through the vehicle computer system directly or through a warning light on the dashboard (or other indicator) that activates in response to a signal from the vehicle computer system.

In various embodiments, a method for checking whether the fuel cap 1 IA is missing or loose may include (but is not limited to) opening the first DCV 21 and closing the second DCV 22. After a fuel fill up, fuel levels in the fuel tank 12 increase. During this time, pressure sensor readings can be monitored through data received from the PS 23. As fuel fills the fuel tank 12, the PS 23 should be reading an increase in pressure as the tank fuel reaches equilibrium. If no change in the pressure reading or the pressure bleeds away, then a determination may be made that either the fuel cap 11A is loose, missing, and/or faulty (e.g., damaged in some way). Accordingly, the vehicle computer system can diagnose this occurrence and provide a notification to a user or technician through various ways including through the vehicle computer system directly or through a warning light on the dashboard (or other indicator) that activates in response to a signal from the vehicle computer system.

In various embodiments, the system 10 further includes a user activation refuel request switch 27 positioned in the cabin of the vehicle for selectively opening a fuel cap door 11E (and/or the fuel cap 11A). The switch 27 is coupled to the engine control module 26. In an example, the user actuates the switch 27, for instance, when the user wishes to refuel the vehicle. Actuating the switch 27 causes the second DCV 22 to open (the first DCV 21 may also be opened, if not already). Accordingly, vapor (pressure) from the fuel tank 12 is released into the evap canister 14. The second DCV 22 is kept open for vapor flow. The engine control module 26 monitors pressure via the PS 23. When the pressure reading at the PS 23 drops to approximately zero kPa (or some other predefined threshold, such as less than 0.5 kPa) or after a predefined time (e.g., 10 seconds, 15 seconds, or other suitable amount of time), the engine control module 26 instructs the fuel cap door 11E to unlock (e.g., FIG. 2B). Thus, after activating the switch 27, the fuel cap door 11E does not open until the earlier of the PS 23 measuring a fuel tank pressure of approximately zero kPa (or other predetermined value) or after a predefined time. In particular embodiments, the user may be notified that the fuel cap door 11E is open. After the user closes the fuel cap door 11E, the engine control module 26 can close the second DCV 22 and, optionally, turn off the notification. In some embodiments, the engine control module 26 may close the second DCV 22 after a predetermined amount of time (e.g., 180 seconds) after opening the fuel cap door 11E, for example, to allow the user to restart the refueling process is the user inadvertently or otherwise closed the fuel cap door 11E prior to finishing refueling. The fuel cap door 11E may further include a fill door position sensor 11C, for example, to determine whether the fuel cap door 11E has been closed. The engine control module 26 can be coupled to a fill door lock solenoid 11D and/or the like for opening the fuel cap door 11E.

Figure 4A:
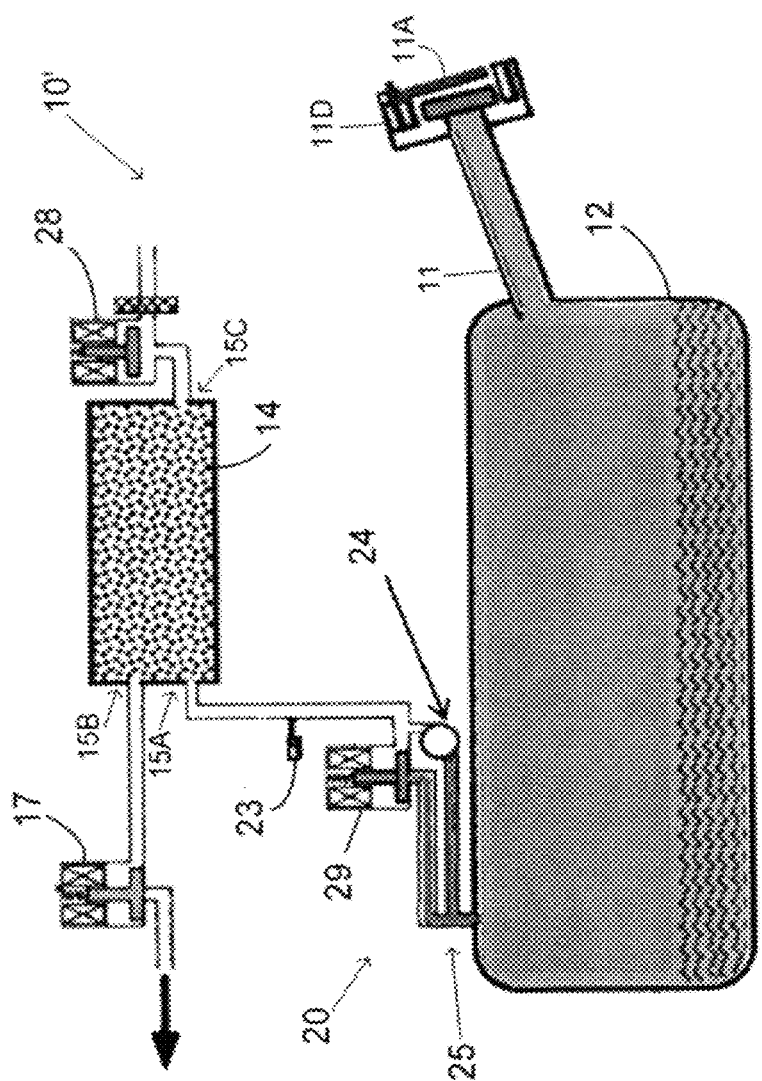
Figure 4B:
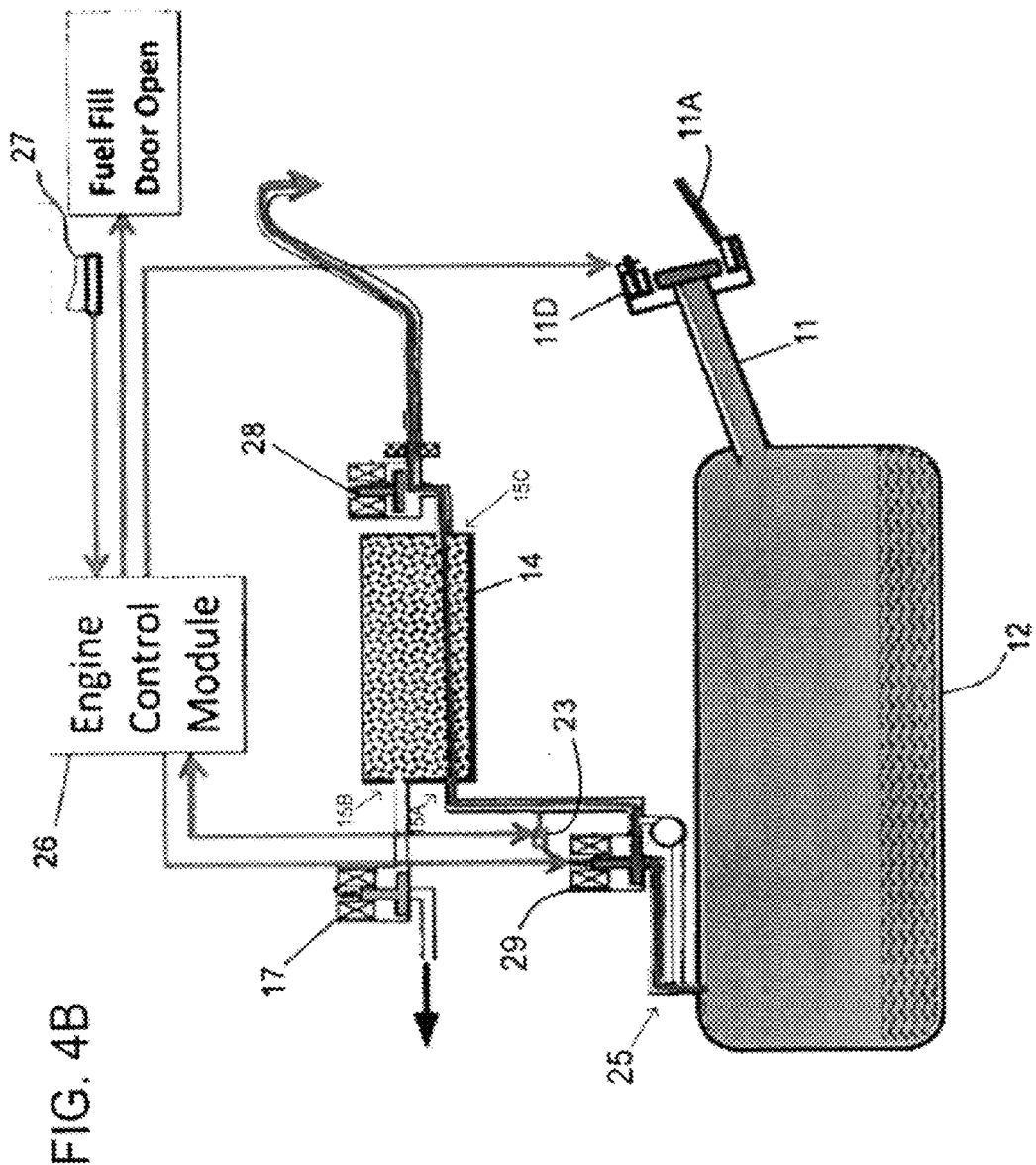

FIGS. 3-4C illustrate an evaporative emissions control system 10' for controlling emissions of a vehicle. The system 10' may be used and/or otherwise function similar to the system 10 (e.g., FIGS. 2A-2C) except that the system 10' uses a single-valve system 20. In particular embodiments, the PS 23 is positioned between the single valve 29 (which may be functionally and structurally equivalent to the second DCV 22 shown in FIGS. 2A-2C) and the evap canister 14. In other embodiments, the PS 23 may be positioned at any suitable location in the system 10' for taking pressure readings in the system 10'. In particular embodiments, the PS 23 may be positioned to be in communication with the system 10' at any location in a triangular region formed by the valve 29, the purge valve 17, and the CVV 28. According to the embodiment shown in FIG. 4A, the first DCV 21 (refer to FIGS. 2A-2C) may be omitted from the system 10'.

In the example of FIG. 4A, the system 10' is shown with the fuel tank 12 being sealed and the evap canister 14 being oversized but not sealed (i.e., open). The PS 23 is positioned between the fuel tank 12 and the evap canister 14. The PS 23 is positioned between the valve 29 and the evap canister 14.

In various embodiments, on board diagnostics ("OBD") can be performed for detecting leaks in the system 10'. During a cold start, the fuel tank 12 should exhibit a natural pressure/vacuum. The CVV 28 is closed and the valve 29 is opened and closed until pressure on the PS 23 reads a predetermined amount (e.g., about ±1.5 kPa). If pressure/vacuum is detected, the system 10' may check for any false fails as discussed. If no pressure/vacuum is detected, then a leak in the fuel tank 12 may be indicated. If pressure/vacuum is detected and if decay occurs, then there may be a leak in the evap canister 14 (and/or related components, such as the purge valve 17). In some embodiments, to diagnose leaks on the canister side during IC engine operation (e.g., after starting from a cold start), the valve 29 is closed to seal the fuel tank 12. The CVV 28 is closed and the purge valve 17 is opened until a vacuum or negative preset pressure reading (e.g., −2 kPa vacuum) is read by the PS 23. As discussed in the disclosure, vacuum decay is then monitored to confirm that a leak in the evap canister 14 exists.

Figure 1:
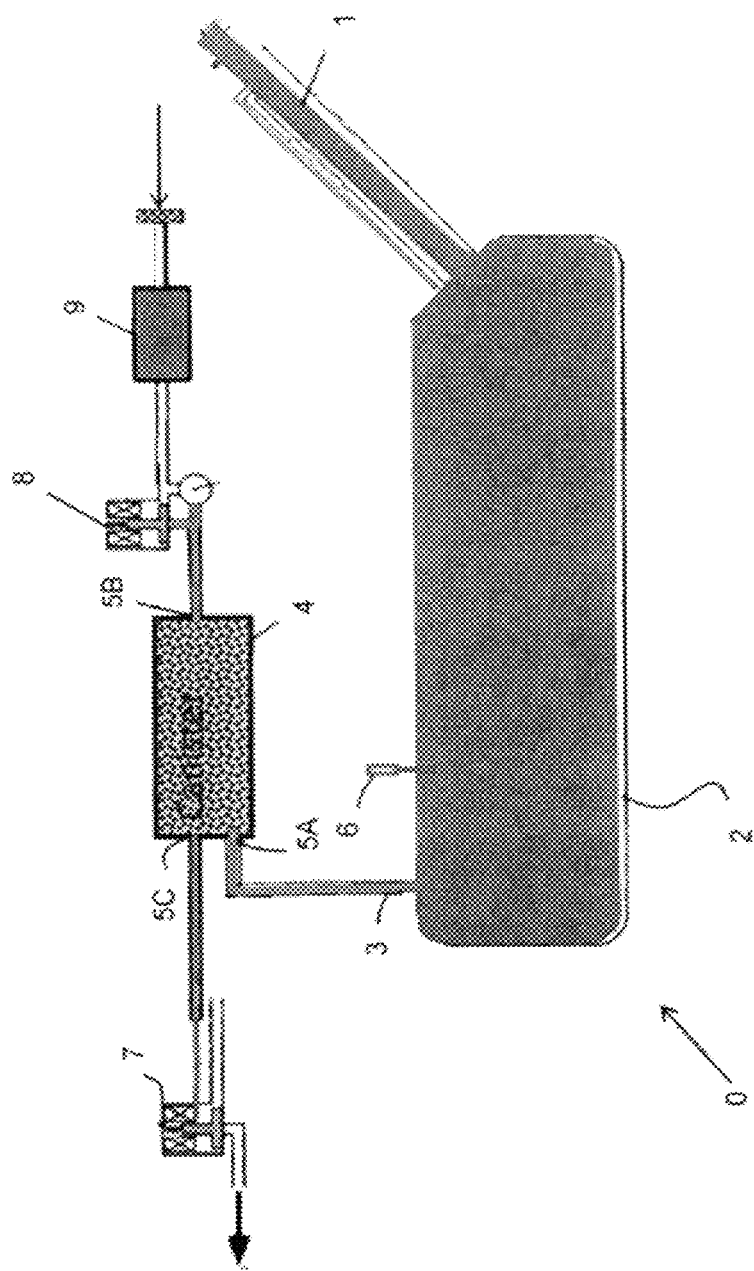
FIG. 1 is a schematic of a prior art evaporative emission control system having a pressurized tank and a vapor recovery canister.
Figure 5B:
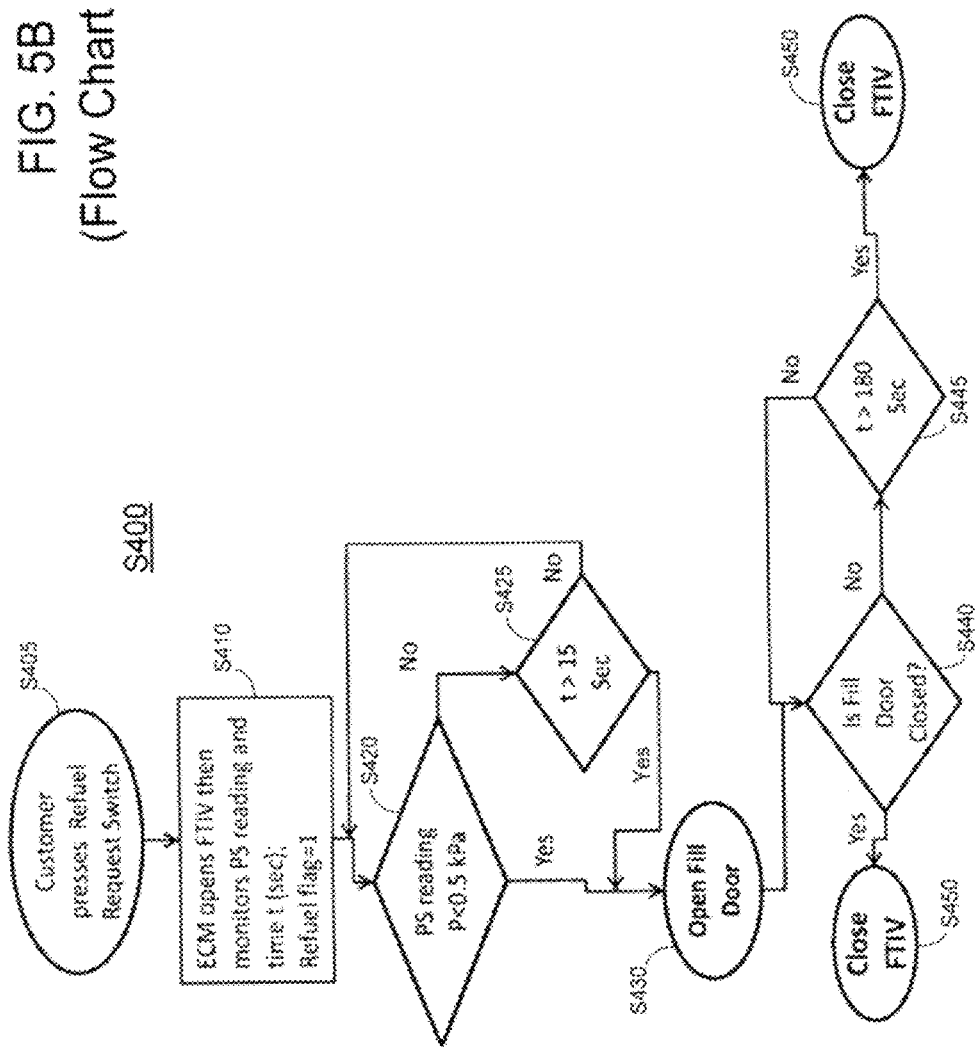
FIG. 5B illustrates a method of controlling an evaporative emission control system while refueling according to various embodiments of the disclosure.

FIG. 5A illustrates a flow chart of a method 5300 of performing evaporation diagnostics on the system 10', for instance, upon starting the vehicle. Such a method (as well as any other method disclosed in the disclosure) may be performed using and/or on the system 10 (e.g., FIGS. 2A-2C) with minimal modification (e.g., by operating both the first DCV 21 and the second DCV 22 like the valve 29 of the system 10'). Likewise, any method associated with the system 10 may be performed using and/or on the system 10' with minimal modification. With reference to FIGS. 3-5E, the engine control module 26 checks if a refuel flag is active (step S310) to determine whether the vehicle has been refueled recently (refer to Flow Chart A shown in FIG. 5B). If yes (S310: yes), then the IC engine is turned on and then engine on evap canister and fuel tank evaporation OBD (e.g., test for faulty fuel cap 11A, large leaks, etc.) is performed (step S312). If the refuel flag is still on (i.e., refuel flag=1), then the evap canister 14 is purged for a preset period (e.g., about 3 minutes) (step S314). The fuel vapor adsorption that occurs during refueling heats the evap canister 14, which decreases the amount of time needed to purge the evap canister. Thus, turning the IC engine on and purging the evap canister 14 after refueling (e.g., a few minutes after refueling) takes much less time than doing so after the evap canister has cooled down. In addition, purging the evap canister 14 after refueling prevents vapor from being stored in the evap canister for a prolonged period of time (e.g., if the IC engine is not used) and thus prevents vapor loss from the evap canister 14 and reduced thermal bleed emissions from the evap canister 14. It should be noted that unlike the prior art (e.g., FIG. 1) no depressurization of the fuel tank 12 is needed to purge the evap canister 14.

If the refuel flag=1 is no (S310: no) and a cold start is performed (S320: yes), then the system 10' will check for small leaks in the sealed fuel tank 12 using the natural pressure/vacuum of the fuel tank 12, for example, by opening and closing the valve 29 to expose the PS 23 to vapor from the fuel tank 12 (step S330) (e.g., as shown in Flow Chart of FIG. 5C). If a malfunction is detected (S340: yes), then the IC engine is turned on to diagnose the malfunction (step S312). If no malfunction is detected (S340: no), then there is no need to force on the IC engine. If the IC engine is not already running (e.g., only running on battery power) (S350: no), the process ends. If the IC engine is already running (S350: yes), then the system 10' performs engine on evap canister evap OBD with the valve 29 closed to seal the fuel tank 12. It should be noted that, in various embodiments, the evap canister 14 is purged when the IC engine is running. In some embodiments, failed component isolation (e.g., the purge valve 17, the CVV 28, the PS 23, and the valve 29) is done when the IC engine is running.

The engine on evap canister evaporation OBD (which is applied to portion A of the system, as shown in FIG. 4C) can be performed by closing the valve 29 and sealing off the fuel tank 12 from the evap canister 14. The OBD involves the use of a manifold vacuum to the purge valve 17 to check for operation of the purge valve 17 and leaks in the evap canister 14. The engine on evap canister and fuel tank evaporation OBD (which is applied to portion B of the system as shown in FIG. 4C) can be performed by opening the valve 29. The OBD involves the use of a manifold vacuum to the purge valve 17 to check for operation of the purge valve 17 and leaks in the entire system including the fuel tank 12 and the evap canister 14.

The engine on evap canister OBD allows for checking the evap canister 14 for leaks using a manifold vacuum. Accordingly, an 8-12 inch H20 vacuum can be created in the evap canister 14. Moreover, less time is required to measure for vacuum decay. Unlike engine on evap canister and fuel tank evaporation OBD, engine on evap canister evaporation OBD may not require vacuum stabilization time and may reduce false fails from fuel evaporation. Time for vacuum pull down and time for vacuum decay will be proportional to the volume of the evap canister 14 (including hoses, valves, etc.) which, in an example, can be about 1-2 L (which compared to the volume of fuel tank 12 and evap canister 14 together are 10-40 L). Therefore, cycling of the purge valve should be controlled so that the amount of time that the purge valve 17 is open is reduced in order to achieve better control of the process of vacuum pull down and decay. Surge valve position may be controlled using a pulse width modulation ("PWM") signal to the valve. The PWM signal should be controlled so that the purge valve 17 is open for the shortest possible time so that less vapor flows past the purge valve 17 resulting in fewer cycles on the PS 23 and less loading of the evap canister 14. Control of the amount of time that the purge valve 17 is open may also prevent too large of a vacuum being formed in the evap canister 14. Reducing the amount of vapor releases also reduces emissions and mitigates fuel weathering.

FIG. 5B illustrates details of Flow Chart A for refueling operation S400. With reference to FIGS. 3-5E, according to various embodiments, a user can initiate a diagnostic check by pressing the refuel request switch 27 (step S405) to open the fuel cap door 11E. The switch 27 is coupled to the engine control module 26, which communicates with the valve 29, the PS 23, and the fuel door lock solenoid 11D. When the switch 27 is pressed, the engine control module 26 opens the valve 29 and then monitors the PS 23 readings versus a preset time interval (t seconds) (step S410). In addition, the fuel flag is set to 1.

If the PS 23 reading is P<0.5 kPa (or some other defined value) (S420: yes), then the refuel door 11A is opened (step 430). If the PS 23 reading is not P<0.5 kPa (S420: no), then the time interval must be greater than a preset time, (e.g., about 15 seconds). If the time is greater than the time t (S425: yes), then the fill door 11A is opened (step 430). If not, then the engine control module 26 continues to read the PS 23 (S425: no). After fill up, once the fuel door is closed (S440: yes), the valve 29 can be closed (step S450), which reseals the fuel tank 12. If not (S440: no), then time is measured again (step S445) and after a given time interval, such as the amount of time during a refueling visit to a fuel station (e.g., 180 seconds) (S445: yes), the valve 29 can be closed (step S450), which reseals the fuel tank 12. Although not show, in some embodiments, the fuel flag may be set to 0 (or other value) after a predetermined amount of time. Another exemplary flow chart for a refueling operation is shown with respect to FIG. 6C.

FIG. 5C illustrates details of Flow Chart B a vehicle cold start evaporation OBD leak detection S500. With reference to FIGS. 3-5E, if performing a cold start (e.g., the vehicle has not run for more than six hours)) (S510: yes), the CVV (or "CVS") 28 is closed and the valve 29 is opened and closed (pulsed) at least once (step S520). If the pressure/vacuum is |P|>1.5 kPa (S530: yes), then pressure/vacuum decay is measured over time (step S532). If the pressure/vacuum decays to a preset level (e.g., 0.5 kPa) within a given time t (e.g., t<10 seconds) (S532: yes), then there may be a possible leak in the evap canister 14. The system 10' can run the diagnostic twice (or any number of times) and provide a notification that a leak exists after, for example, at least two consecutive fails (or upon satisfying an other predetermined condition) (step S534). If no decay, then the OBD passes (step S536).

If the pressure/vacuum is |P|>1.5 kPa is not satisfied (S530: no), then the valve 29 is opened (step S540) and the PS 23 reading is taken again for the statement |P|>1.5 kPa (step S550). If the target pressure/vacuum is reached (S550: yes), then the valve 29 is closed (step S555) and the system 10' continues to measure decay (step S532) as discussed above. If the target pressure/vacuum is not reached (S550: no), then a time interval t (e.g., 10 seconds) is measured (step S560) at which point the valve 29 is closed and the CVV 28 is opened (step S565). The OBD may result in a malfunction or leak including, but not limited to, one of the following: small or large leak in the fuel tank 12; the PS 23 has malfunctioned; large leak in the evap canister 14; the CVV 28 is stuck open; the valve 29 is stuck closed, and/or the like. In some embodiments, the system 10' runs a false fail analysis can be performed (method S600), as shown in Flow Chart C in FIG. 5D.

FIG. 5D illustrates details of the How Chart C for a false fail analysis S600. With reference to FIGS. 3-5E, in some embodiments, in step S610, a difference in temperature, pressure, and/or consumption of fuel is analyzed. If any of certain conditions are met (S620: yes), then the test is discarded (step S630) (i.e., there was a false failure). The certain conditions may represent several possible causes for the failure. Some examples include (but are not limited to) there was a negative fuel tank pressure change since the previous trip (i.e., since the last cold start that fuel tank pressure was not zero) and ambient temperature decreased (e.g., by at least 4 degrees Celsius or other suitable value) causing the fuel tank pressure to be approximately zero; there was a positive fuel tank pressure change since the previous trip and ambient temperature increased causing the fuel tank pressure to be approximately zero; there was positive fuel tank pressure change since the previous trip and the ambient pressure decreased (e.g., traveled from lower altitude to higher altitude) causing the fuel tank pressure to be approximately zero; there was a negative fuel tank pressure change since the previous trip and the ambient pressure increased (e.g., traveled from higher altitude to lower altitude) causing the fuel tank pressure to be approximately zero; or there was a negative fuel tank pressure change and fuel has been consumed causing the fuel tank pressure to be approximately zero. If none of the conditions exist (S620: no), then the IC engine is started and diagnostics are run to isolate a particular component malfunction (e.g., purge valve 17, CVV 28, PS 23, and/or valve 29) (S640). A malfunction notification (e.g., malfunction indicator light (MIL)) can be sent to a user, in this example, after two (or other number of) fails (step S650).

Figure 5E:
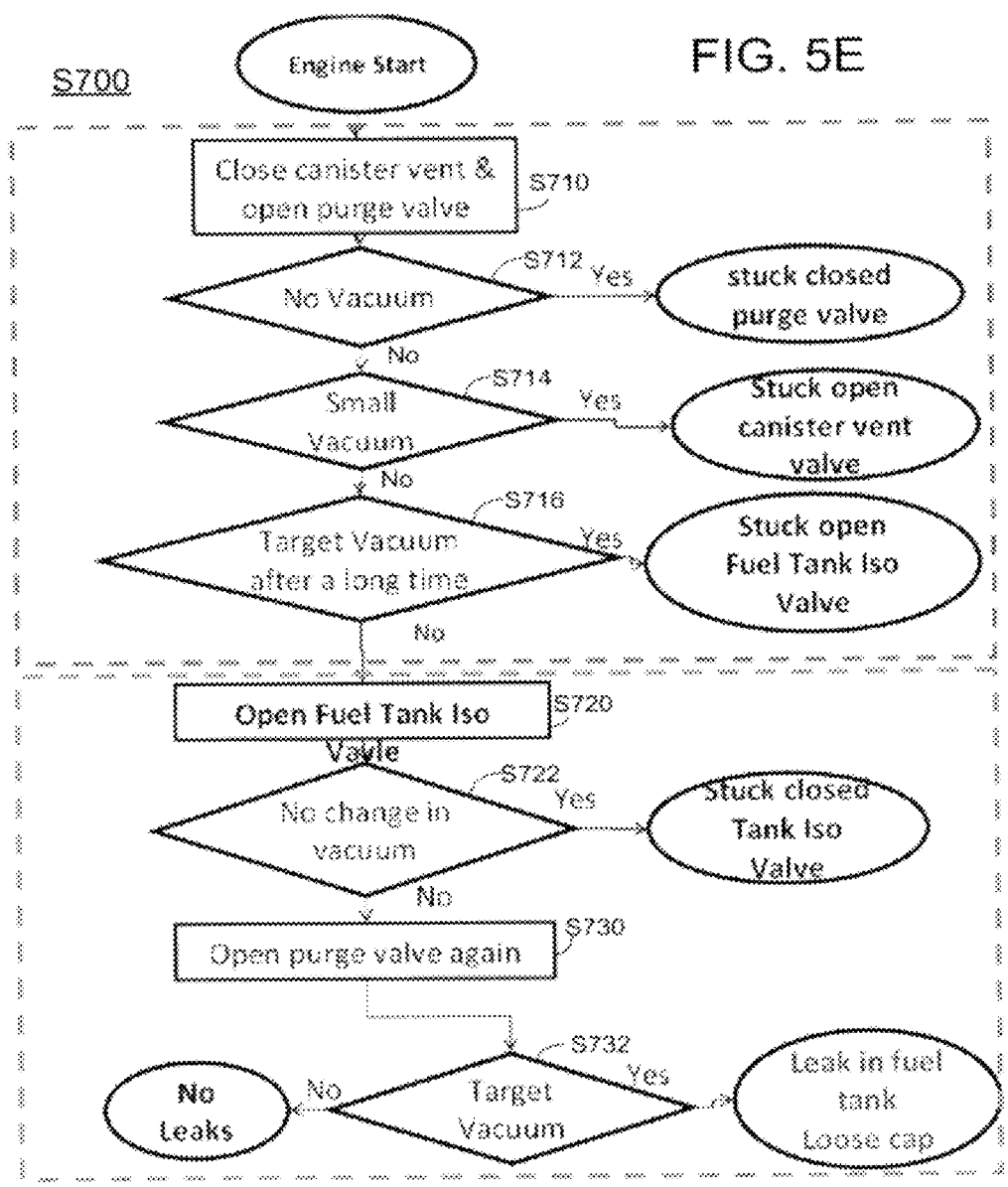

FIG. 5E illustrates details of a method S700 for detecting malfunction in components of the system 10', which may be performed after starting the IC engine. With reference to FIGS. 4C-5E, in a first phase, the CVV 28 may be closed and the purge valve 17 may be opened (step S710). (The valve 29 is closed also if not already closed.) The PS 23 starts taking a pressure reading for the evap canister 14. If the pressure reading is such that no vacuum is present (S712: yes), this may indicate that the purge valve 17 is stuck closed or otherwise malfunctioning. Otherwise, the method continues (S712: no). If the pressure reading is such that there is a small vacuum (i.e., less than a target vacuum) present (S714: yes), this may indicate that the CVV 28 is stuck open or is otherwise malfunctioning. Otherwise, the method continues (S714: no). If the pressure reading is such that the target vacuum is reached after a time above a certain threshold, this may indicate that the valve 29 is stuck open or is otherwise malfunctioning. Otherwise, the method continues (S716: no).

In a second phase, the valve 29 is opened (step S720). The PS 23 begins taking a pressure reading for the fuel tank 12 (and the evap canister 14). If the pressure reading is such that there is no change in vacuum (S722: yes), this may indicate that the valve 29 is stuck closed or is otherwise malfunctioning. Otherwise, the method continues (S722: no). Then, the purge valve 17 is opened again (step S730). The PS 23 begins taking a pressure reading for the fuel tank 12 (and the evap canister 14). If the pressure reading is such that there is the target vacuum (S732: yes), this may indicate that there is a leak in the fuel tank 12 and/or the fuel cap 11A is loose or otherwise malfunctioning. If the pressure reading is such that there is no target vacuum (S732: no), this may indicate that there are no leaks in the system 10' and/or that the components of the system 10' are functioning properly. The first phase of the method S700 may correspond to diagnostics of the first region A (refer to FIG. 4C), and the second phase of the method S700 may correspond to diagnostics of the second region B (refer to FIG. 4C).

FIGS. 6A-6H illustrate various examples of diagnostics that may be performed by the system 10' (or 10), a method for Sealed Fuel Tank Pressure (SFTP) diagnostic is provided to detect small leaks in PHEV fuel tank by employing naturally occurring tank pressure changes. For example, if the fuel tank 12 with RVP 7 psi fuel is sealed at 75° F. and then the temperature increases to 100° F., the fuel tank pressure may increase by 3.2 psig, of which 2.7 psig is due to the vapor pressure increase of the fuel and 0.5 psig is due to thermal expansion of the headspace gases. If the temperature decreases back to 75° F. from 100° F., 3.2 psig pressure will decrease to 0 psig. If there are any leaks (leaks much smaller than 0.020" in diameter) in the fuel tank 12, the fuel tank 12 will not build up any pressure with increase in temperature. The PHEV fuel tank temperature increase can occur by two different mechanisms: daily ambient diurnal temperature increase and thermal load from the surrounding electrical drive system. The SFTP diagnostic will utilize the fuel tank pressure increase by both the mechanisms in two phases.

Figure 6A:
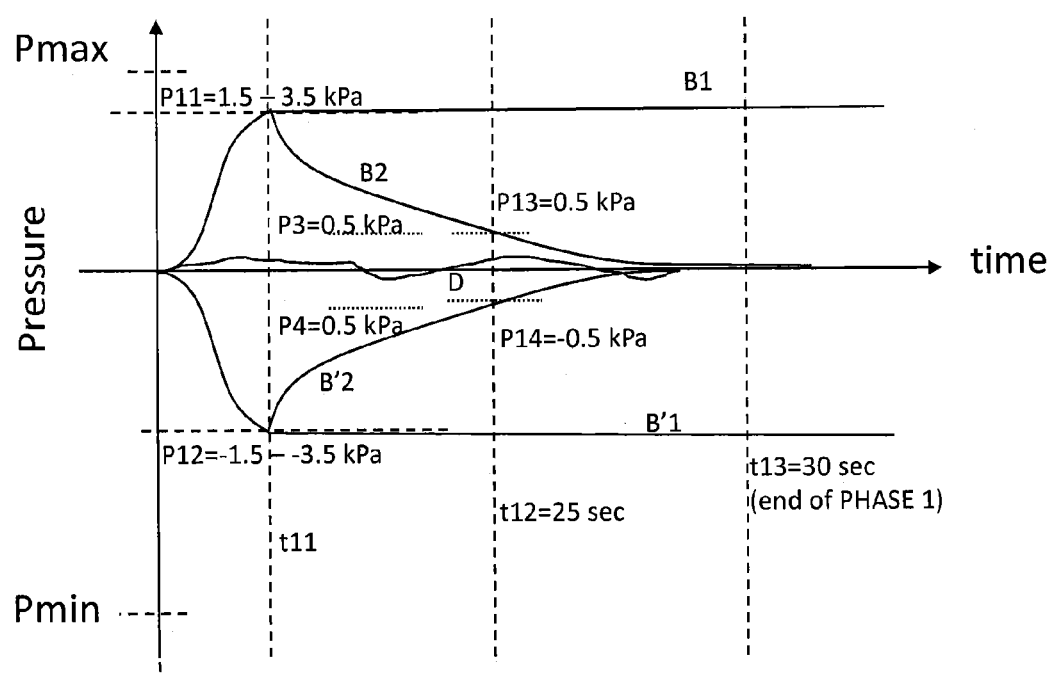
FIG. 6A-6H illustrates a diagnostic process for leak and malfunction detection according to various embodiments of the disclosure.
Figure 6B:
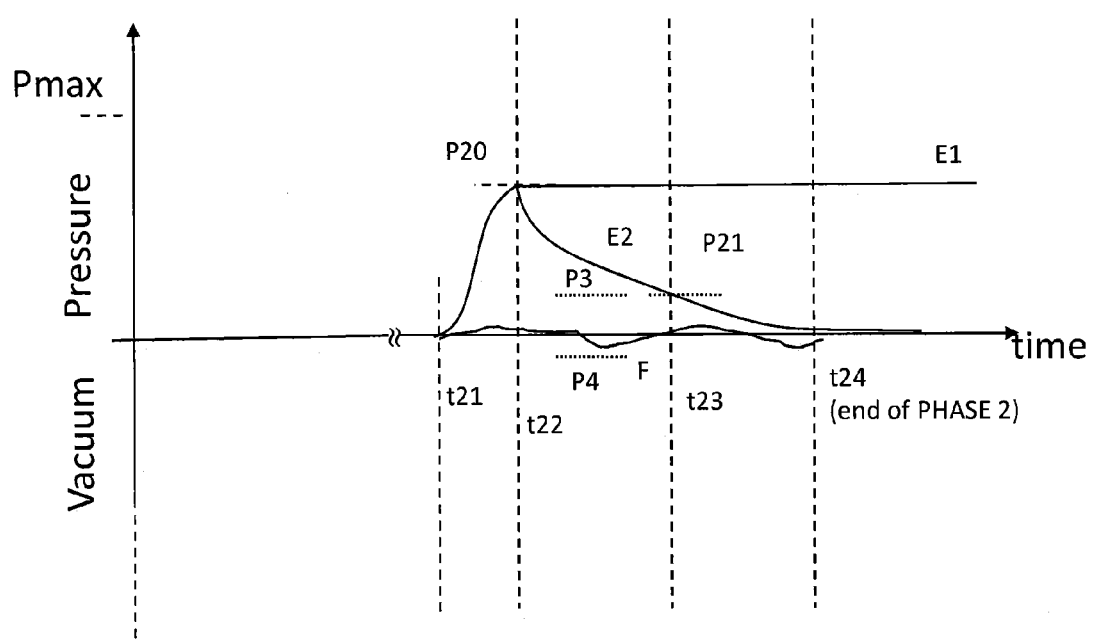
Figure 6C:
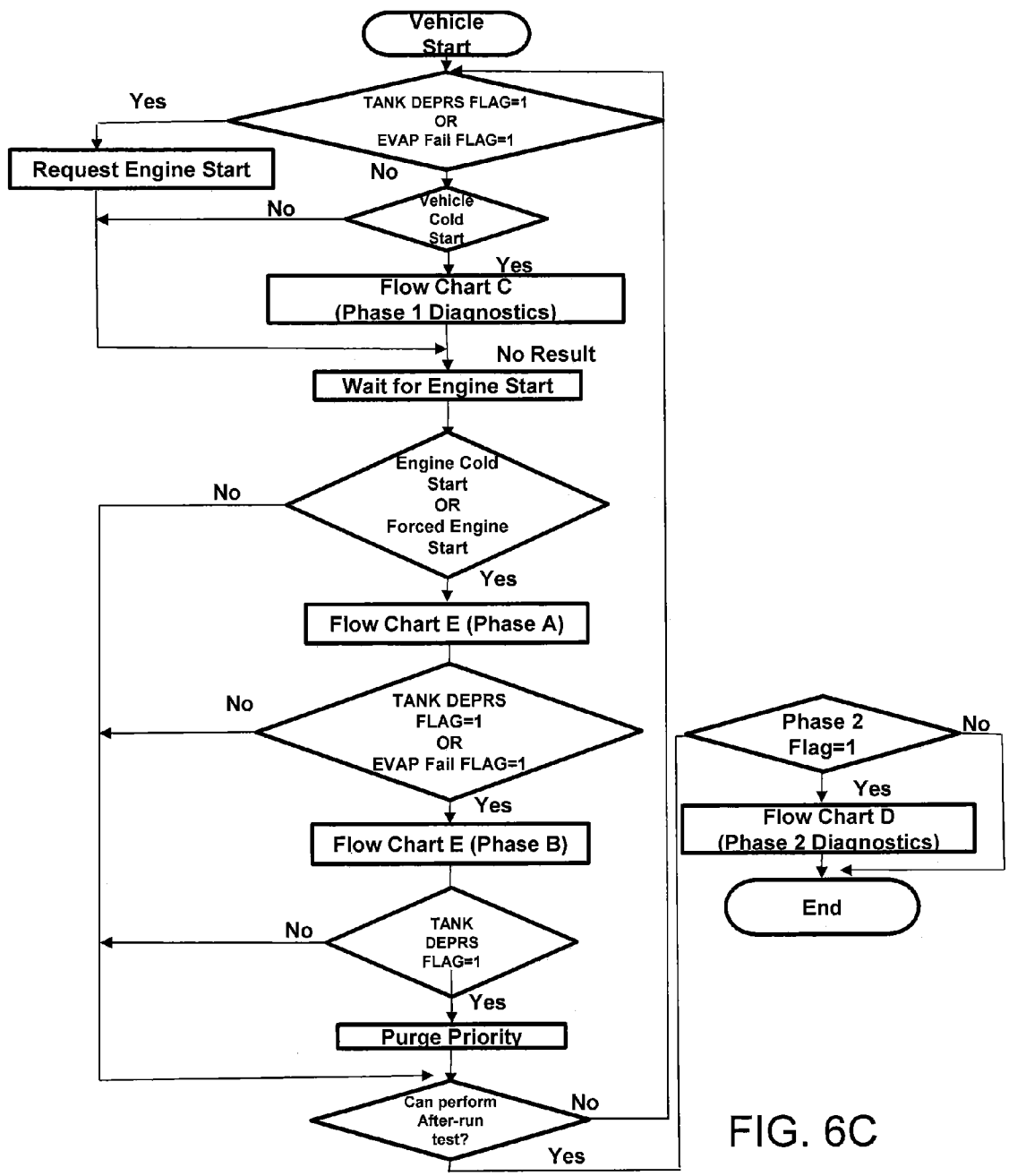
Figure 6D:
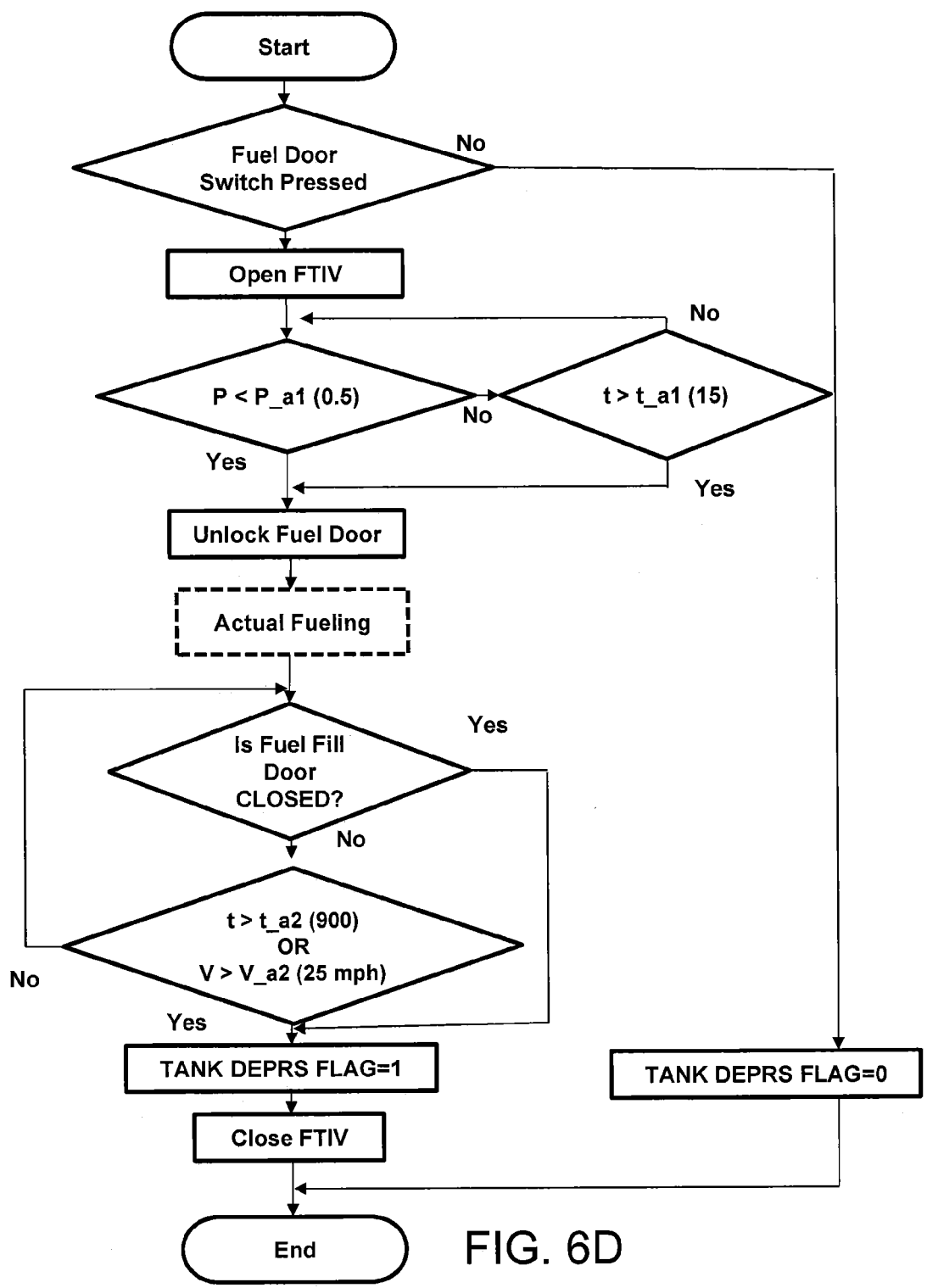
Figure 6E:
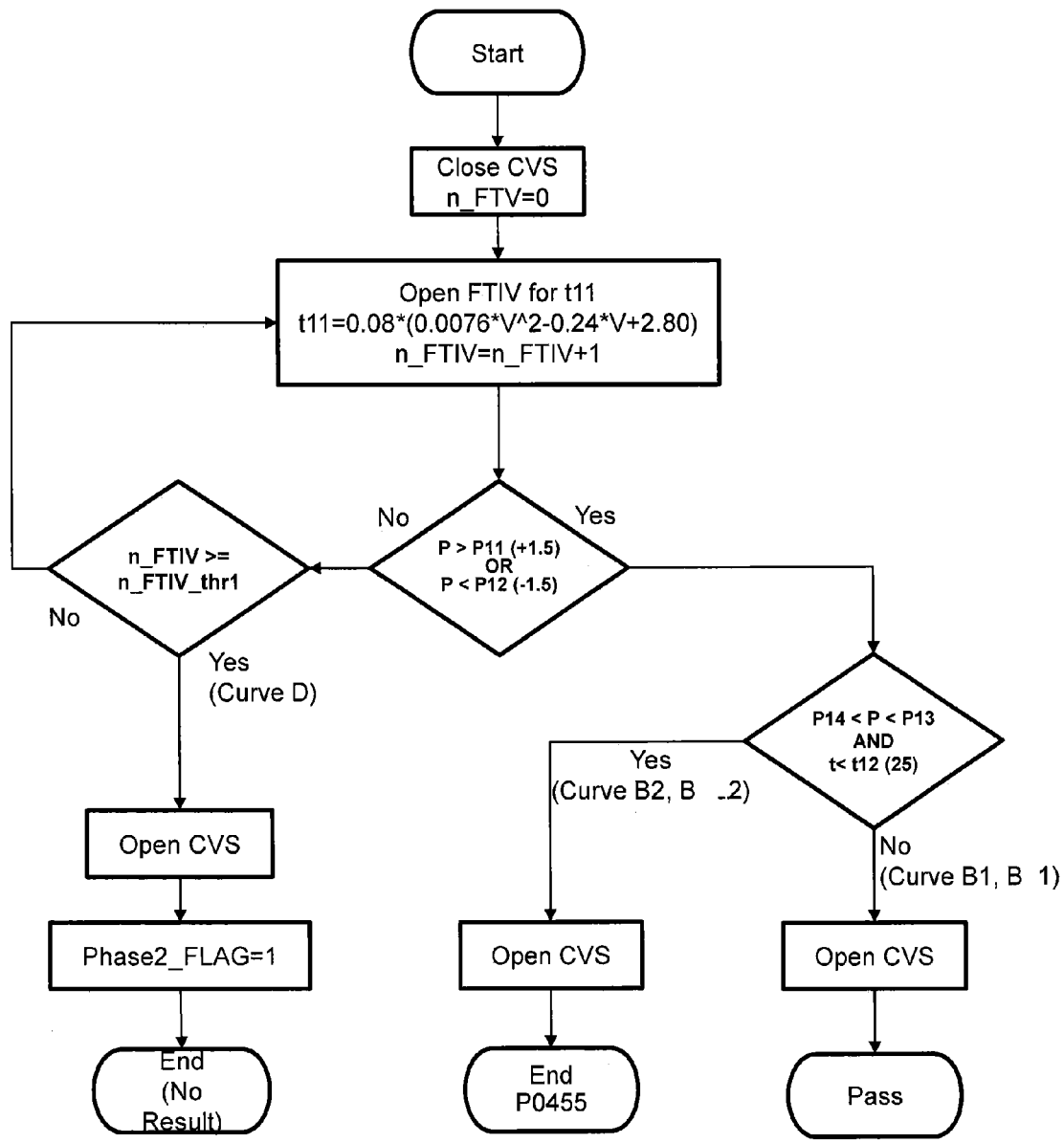

In a first phase, an example of which is illustrated in FIG. 6E, is executed after every cold start. The system 10' checks for natural diurnal tank 12 pressure/vacuum by closing the CVV 28 and opening the valve 29. FIG. 6A shows various possible scenarios of pressure sensor response characteristics. If the tank pressure is high (e.g., >15 kPa), the PS 23 maxes out when the valve 29 is opened and closed once. Therefore, actual pressures (dotted curves in FIG. 6B) will be higher than those indicated by the maxed out the PS 23. If the system 10' detects pressure/vacuum in phase 1, this is an indication of leak-free fuel tank 12 and the test will end after evap canister 14 leak check by monitoring evap canister 14 pressure/vacuum decay.

Figure 6F:
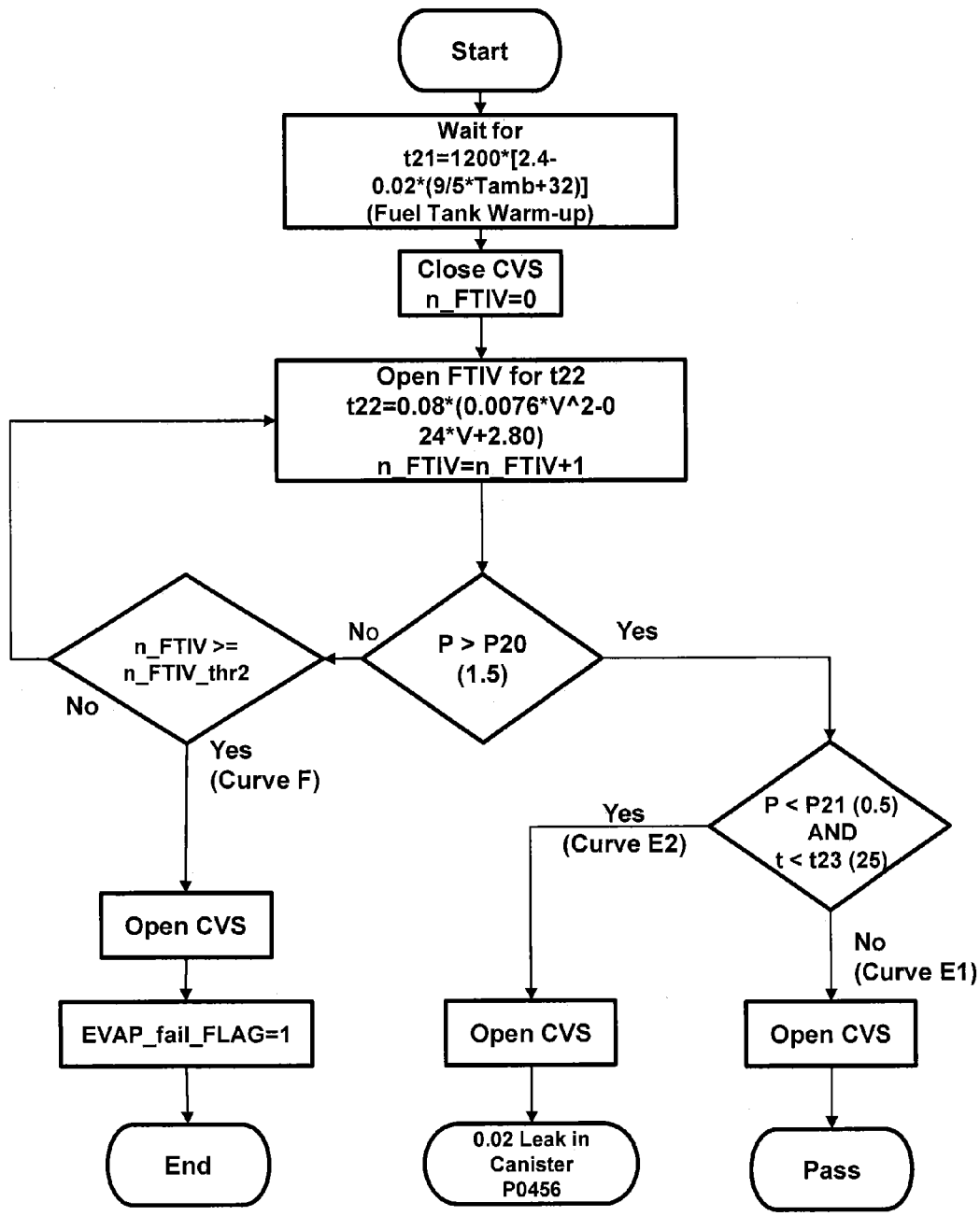

If the system detects no pressure/vacuum in the first phase, then the second phase is executed (refer to FIG. 6F). No pressure/vacuum detection in phase 1 can be due to leaks or anomalous diurnal temperature changes, atmospheric pressure changes, and/or fuel consumption. Phase 2 monitors fuel tank pressure (shown in the pressure curves of FIG. 6B), which is expected after a minimum run time of the vehicle electrical drive system.

Figure 6G:
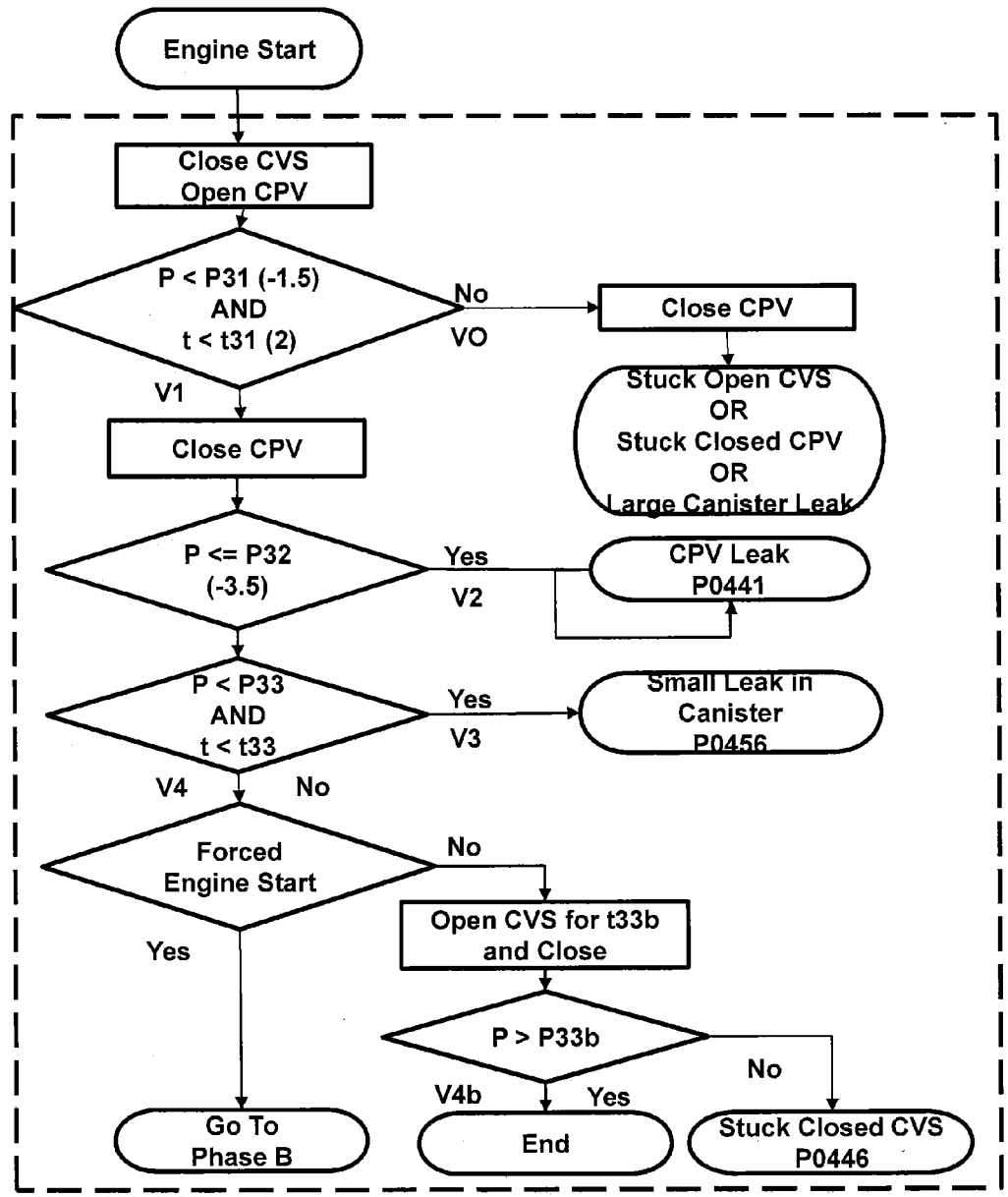
Figure 6H:
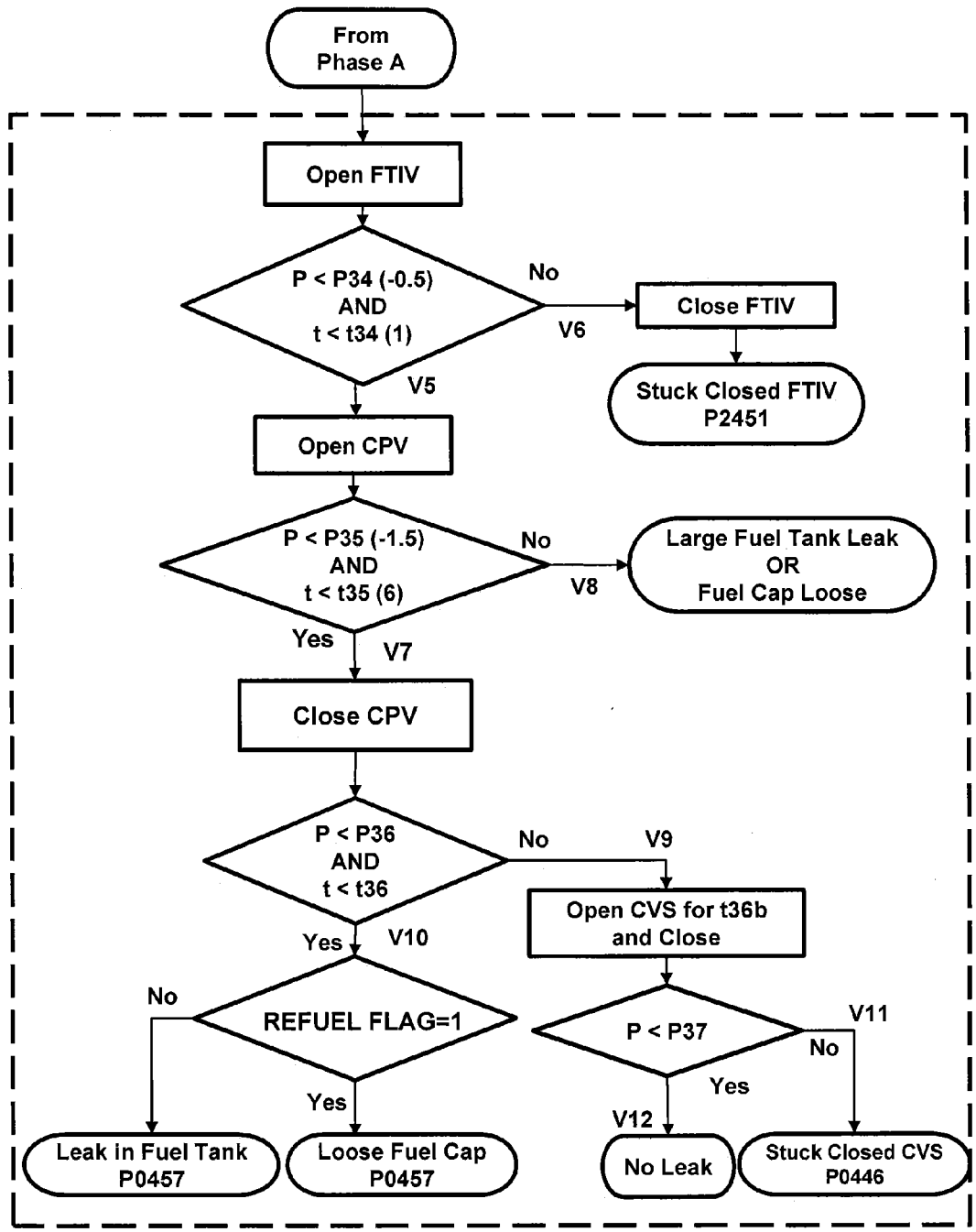

FIGS. 6C-6H illustrate various flow charts associated with example diagnostic methods of the present disclosure. FIG. 6C provides an overall high level flow chart beginning with a vehicle start. At the start, the system 10' determines if a refuel is being performed which can be initiated by a user of the vehicle as illustrated, for example, in FIG. 6D. If not, then the system 10' determines if a cold start is performed. If a cold start has been determined to have been performed, then Phase 1 leak detection occurs, as detailed in FIG. 6E (which may be similar to FIG. 5E). FIG. 6F (which may be similar to FIG. 5E) provides details if the diagnostics continue to Phase 2 leak detection. FIGS. 6G and 6H illustrate malfunction component identification diagnostics, for example as discussed in the disclosure. In consecutive steps, the system 10' isolates the canister and then the combination of the evap canister 14 and the fuel tank 12, as discussed.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system comprising:
    a fuel tank;
    a canister in fluid communication with the fuel tank to receive vapor escaping from the fuel tank;
    a first diurnal control valve and a second diurnal control valve positioned sequentially along a first vapor line that extends from the fuel tank to the canister, wherein each of the first diurnal control valve and the second diurnal control valve is an on/off valve;
    a pressure sensor in fluid communication with the canister and arranged on the first vapor line between the first diurnal control valve and the second diurnal control valve;
    a release valve positioned along a second vapor line that extends from the fuel tank to the canister and bypasses the first diurnal control valve, the pressure sensor and the second diurnal control valve;
    a purge valve positioned between the canister and an internal combustion engine to be in fluid communication with the canister and the internal combustion engine;
    a canister vent valve positioned on an air inlet of the canister for allowing air to purge vapor from the canister to exit the canister and into the internal combustion engine; and
    one or more electronic controllers coupled to the pressure sensor, the first diurnal control valve, the purge valve, and the canister vent valve for controlling each of the first diurnal control valve, the purge valve, and the canister vent valve according to preset diagnostic tests for checking for malfunctions in the system,
    wherein the preset diagnostic tests are configured to check for malfunctions of the purge valve, the canister vent valve and the first diurnal control valve.

2. The system of claim 1, wherein the results of the diagnostic test initiate a notification to a user of the system.

3. The system of claim 1, wherein the one or more electronic controllers are configured to control the first and the second diurnal control valves to selectively seal the fuel tank from the canister.

4. The system of claim 3, wherein the one or more electronic controllers perform a first diagnostic in a case where at least one of the first and the second diurnal control valves is closed to seal the fuel tank from the canister, and wherein the one or more electronic controllers perform a second diagnostic in a case where both the first and the second diurnal control valves are open such that the fuel tank and the canister are in fluid communication.

5. The system of claim 3, wherein the one or more electronic controllers control the first and the second diurnal control valves to allow a pressure in the fuel tank and a pressure in the canister to equalize for a predetermined amount of time.

6. The system of claim 5, wherein, after the predetermined amount of time, in a case where the canister is sealed and the pressure sensor senses decay in the pressure of the canister, the one or more electronic controllers provide an indication that there may be a malfunction in the system.

7. The system of claim 5, wherein, after the predetermined amount of time, in a case where the canister is sealed and the pressure sensor does not sense that the pressure of the canister is above a predetermined value, the one or more electronic controllers provide an indication that there may be a malfunction in the system.

8. The system of claim 1, wherein at least one of the diagnostic tests is performed upon starting a vehicle after the vehicle has been off for a predetermined amount of time.

9. The system of claim 1, wherein the one or more electronic controllers are configured to purge the vapor in the canister during operation of the internal combustion engine.

10. The system of claim 9, wherein the vapor is purged after refueling the fuel tank.

11. The system of claim 9, wherein the vapor is purged in response to actuation of a switch by a user of the vehicle.

12. The system of claim 9, wherein at least one of the diagnostic tests is performed during the operation of the internal combustion engine.

13. The system of claim 9, wherein the vapor is purged during operation of the internal combustion engine by opening the canister vent valve and the purge valve.

14. The system of claim 1, wherein the one or more electronic controllers are configured to perform a false fail analysis on the basis of changes in a temperature, a pressure and a fuel tank fuel level.

15. The system as in claim 1,
wherein the first diurnal control valve is an open on/off valve and the second diurnal control valve is a closed on/off valve that enables a user to one of perform a rationality check of the pressure sensor and facilitate the pressure sensor to provide an indication of leaks in at least the canister.

16. The system of claim 1, wherein the preset diagnostics are further configured to check for a malfunction in the pressure sensor, a leak in the canister, and a leak in the fuel tank.

* * * * *